United States Patent
Lee et al.

(10) Patent No.: US 10,019,162 B2
(45) Date of Patent: Jul. 10, 2018

(54) STORAGE DEVICE MANAGING NONVOLATILE MEMORY DIFFERENTLY DEPENDING ON TENDENCY OF INTERRUPTION OF POWER SUPPLY

(71) Applicant: Samsung Electronics Co., Ltd., Suwon-si, Gyeonggi-do (KR)

(72) Inventors: Bumhee Lee, Seoul (KR); Woonjae Chung, Gunpo-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 45 days.

(21) Appl. No.: 15/176,140

(22) Filed: Jun. 7, 2016

(65) Prior Publication Data
US 2017/0060426 A1    Mar. 2, 2017

(30) Foreign Application Priority Data
Aug. 31, 2015  (KR) .......................... 10-2015-0122914

(51) Int. Cl.
*G06F 12/02*   (2006.01)
*G06F 3/06*    (2006.01)

(52) U.S. Cl.
CPC .......... *G06F 3/0604* (2013.01); *G06F 3/0634* (2013.01); *G06F 3/0688* (2013.01); *G06F 12/0261* (2013.01); *G06F 12/0253* (2013.01); *G06F 2212/1016* (2013.01)

(58) Field of Classification Search
CPC .... G06F 3/0604; G06F 3/0634; G06F 3/0688; G06F 12/0261; G06F 12/0253
USPC .................................. 711/102, 103; 707/813
See application file for complete search history.

(56) References Cited

U.S. PATENT DOCUMENTS

| | | | |
|---|---|---|---|
| 7,809,962 B2 | 10/2010 | Chang et al. | |
| 8,725,977 B2 | 5/2014 | Moon et al. | |
| 8,909,850 B2 | 12/2014 | Sopko et al. | |
| 8,959,280 B2 | 2/2015 | Yu et al. | |
| 2007/0061525 A1* | 3/2007 | Hildebrand | G11C 5/14 711/154 |
| 2007/0106919 A1 | 5/2007 | Chang et al. | |
| 2009/0292887 A1* | 11/2009 | Manczak | G06F 1/30 711/162 |
| 2011/0202707 A1 | 8/2011 | Moon et al. | |
| 2012/0232744 A1 | 9/2012 | Vilar et al. | |
| 2012/0278564 A1* | 11/2012 | Goss | G06F 12/0253 711/155 |
| 2012/0284587 A1* | 11/2012 | Yu | G06F 3/0608 714/773 |

(Continued)

FOREIGN PATENT DOCUMENTS

KR    20150003577 A    1/2015

*Primary Examiner* — Than Nguyen
(74) *Attorney, Agent, or Firm* — Renaissance IP Law Group LLP

(57) ABSTRACT

A storage device includes one or more nonvolatile memories and a memory controller. The memory controller controls operations of the nonvolatile memories. The memory controller controls the nonvolatile memories differently based on a data amount of write data stored in the nonvolatile memories and/or read data output from the nonvolatile memories according to the operations of the nonvolatile memories during each of a plurality of power supply intervals between a point in time where power is supplied and a point in time where the supplied power is interrupted.

19 Claims, 21 Drawing Sheets

(56) References Cited

U.S. PATENT DOCUMENTS

| | | |
|---|---|---|
| 2014/0115233 A1 | 4/2014 | Goss et al. |
| 2014/0281145 A1 | 9/2014 | Tomlin et al. |
| 2015/0006939 A1 | 1/2015 | Lim et al. |
| 2015/0106557 A1 | 4/2015 | Yu et al. |
| 2015/0242141 A1* | 8/2015 | Kuo ........................ G06F 11/00 713/193 |
| 2017/0090763 A1* | 3/2017 | Horn ..................... G06F 3/0604 |
| 2017/0177217 A1* | 6/2017 | Kanno .................... G06F 3/061 |

* cited by examiner

FIG. 4

| Length of Power Supply Interval | Data amount | Repetition of PWR ON/OFF |
|---|---|---|
| Long | Large | Rare |
| ↕ | ↕ | ↕ |
| Short | Small | Frequent |

For second operation mode (Type A) :

For First operation mode (Type A) :

For Second operation mode (Type C):

For First operation mode (Type C):

FIG. 15

| Length of Power Supply Interval | Amount of free blocks | Repetition of PWR ON/OFF |
|---|---|---|
| Long | Large | Rare |
| ↕ | ↕ | ↕ |
| Short | Small | Frequent |

STORAGE DEVICE MANAGING NONVOLATILE MEMORY DIFFERENTLY DEPENDING ON TENDENCY OF INTERRUPTION OF POWER SUPPLY

CROSS-REFERENCE TO RELATED APPLICATIONS

The present application claims priority under 35 U.S.C. § 119 to Korean Patent Application No. 10-2015-0122914 filed on Aug. 31, 2015, in Korean Intellectual Property Office, the entire contents of which are incorporated herein by reference.

TECHNICAL FIELD

The present disclosure relates to data storage, and more particularly, to a configuration and a technique for managing a nonvolatile memory included in a storage device.

DESCRIPTION OF THE RELATED ART

Electronic devices of all kinds are becoming ubiquitous throughout the world. Generally speaking, an electronic device performs its own function according to operations of various electrical or electronic circuits included therein. A storage device is an example of an electronic device, which stores data and outputs data—usually while communicating with a host. Storage devices provide a storage service according to operations of the electrical or electronic circuits included therein.

Some storage devices include a nonvolatile storage medium, which means that data stored in the storage device is retained permanently or semi-permanently regardless of whether or not power is supplied from a power supply. Some storage devices are manufactured to include a solid state medium that operates electrically, such as with the case of a semiconductor memory, rather than including a mechanically operating medium such as a conventional hard disk drive. Storage devices that include a semiconductor memory (e.g., a solid state drive (SSD)) are widely being used in various fields due to their fast operational speed.

Storage devices including a semiconductor memory perform various functions according to operations of various circuits included therein. Various methods have been proposed to improve the performance or other operating characteristics of circuits included in the storage device, or to manage an operation of the storage device.

SUMMARY

The present disclosure may provide a configuration and an operation for managing a nonvolatile memory included in a storage device. In some example embodiments of the present disclosure, the nonvolatile memory may be managed differently according to a tendency of power supply interruptions to occur in the storage device.

In some example embodiments, a storage device may include one or more nonvolatile memories and a memory controller. The memory controller may control operations of the nonvolatile memories. The memory controller may control the nonvolatile memories differently based on a data amount of at least one of (a) write data stored in the one or more nonvolatile memories or (b) read data output from the one or more nonvolatile memories, according to the operations of the one or more nonvolatile memories during each of a plurality of power supply intervals between a point in time where power is supplied and a point in time where the supplied power is interrupted.

In some example embodiments, a storage device may include a memory controller, one or more nonvolatile memories, and a mode register. The nonvolatile memories may store or output data under a control of the memory controller, and store information associated with a data amount of the data that is stored or output during each of a plurality of power supply intervals between a point in time where power is supplied to the one or more nonvolatile memories and a point in time where the supplied power is interrupted. The mode register may store a status value that indicates an operation mode of the one or more nonvolatile memories. The memory controller may determine (i.e., select) the operation mode of the nonvolatile memories based on the data amount.

In some example embodiments, a storage device may include one or more nonvolatile memories, and a memory controller configured to control operations of the one or more nonvolatile memories. In some embodiments, the memory controller is configured to control the one or more nonvolatile memories in a first operating mode or a second operating mode different from the first operating mode depending on a data amount of write data stored in the one or more nonvolatile memories during each of a plurality of intervals of time.

BRIEF DESCRIPTION OF THE DRAWINGS

The above and other objects, features, and advantages will become apparent from the following description with reference to the following figures, wherein like reference numerals refer to like parts throughout the various figures unless otherwise specified, and wherein:

FIG. 4 is a table showing a relationship between a data amount obtained according to an example embodiment and power supply interruptions;

FIG. 15 is a table showing a technique for managing operations of nonvolatile memories based on an amount of free blocks in an example embodiment;

DETAILED DESCRIPTION OF EMBODIMENTS

All the above-mentioned features and the following description are provided to assist in the understanding of the present disclosure. That is, the present disclosure should not be construed as limited to the "example" embodiments set forth herein, and may be embodied in different forms. The following embodiments are merely examples for fully disclosing the present invention, and are described to provide the inventive concepts to those skilled in the art. Therefore, if there are many ways to implement the components of the present disclosure, it is obvious that the present disclosure is implemented with any one of the ways or any one of the similar things thereof.

If it is mentioned that any configuration includes/comprises specific component(s) or any process includes/comprises specific operation(s) in the present disclosure, this means that other component(s) or other operation(s) may be further included. That is, the terms used herein are only intended to describe the specific example embodiments, and is not intended to limit the scope of the present disclosure. Further, the examples described herein to assist in the understanding of the present disclosure include their complementary embodiments.

The terms used herein have the meanings in which those skilled in the art would generally understand. The terms commonly used are to be construed as the consistent meanings in the context of the present disclosure. In addition, the terms used herein should not be interpreted as an overly ideal or formal sense unless explicitly so defined herein. Hereinafter, example embodiments of the present disclosure are described below with reference to the attached drawings.

Figure 1:
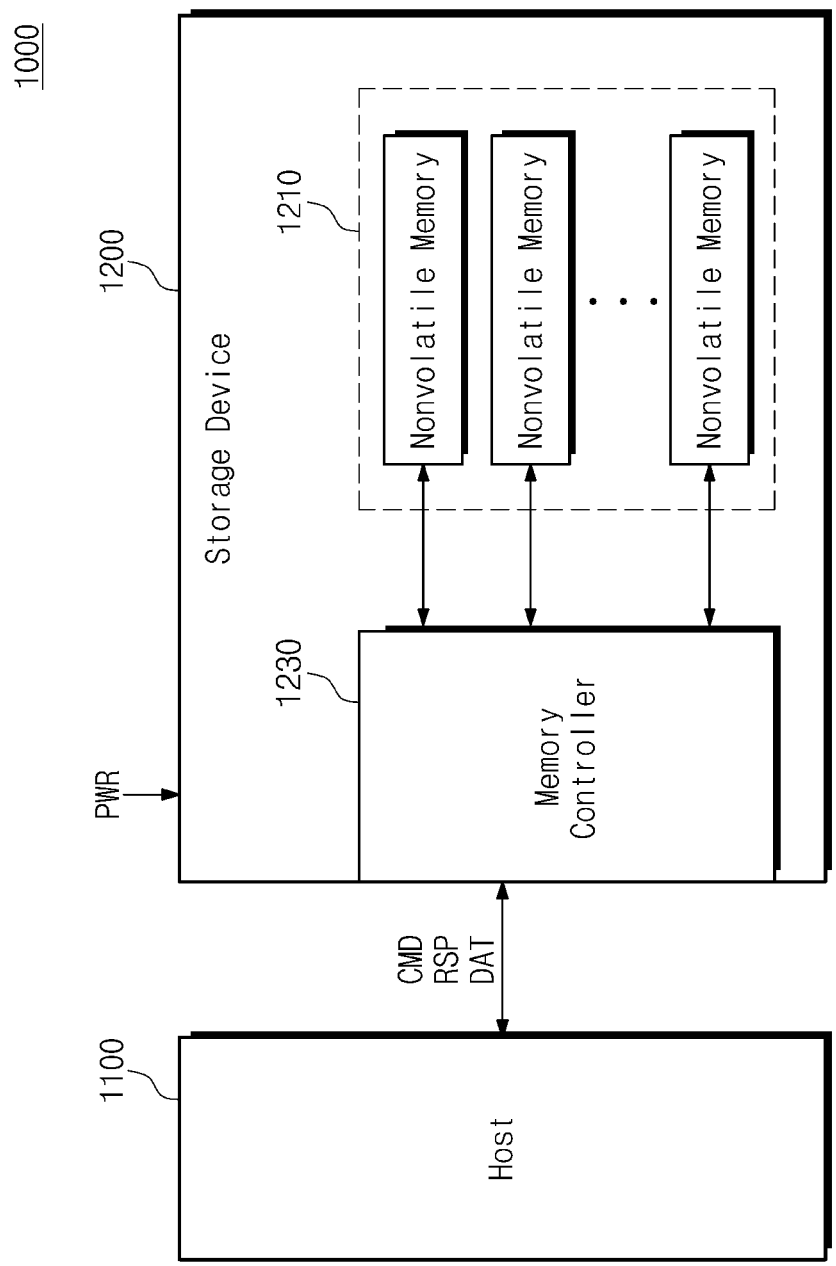
FIG. 1 is a block diagram illustrating a storage system including a storage device according to an example embodiment.

FIG. 1 is a block diagram illustrating a storage system 1000 including a storage device 1200 according to an example embodiment. The storage system 1000 may include a host 1100 and the storage device 1200. The host 1100 may provide a command CMD to the storage device 1200. The host 1100 may exchange data DAT with the storage device 1200. The host 1100 may receive a response RSP corresponding to a command CMD from the storage device 1200.

For example, when the data DAT includes write data, the host 1100 may provide the storage device 1200 with the command CMD including a write command and the data DAT including the write data. The host 1100 may recognize that the write data is stored in the storage device 1200 with reference to the response RSP provided from the storage device 1200. By way of another example, when the data DAT includes read data, the host 1100 may provide the command CMD including a read command to the storage device 1200. The host 1100 may receive the data DAT including the read data from the storage device 1200. Accordingly, the storage system 1000 may provide a storage service to a user.

For example, the host 1100 may be implemented to include one or more processor cores. For example, the host 1100 may include a general-purposed processor, a special-purposed processor, microprocessor, or an application processor. The host 1100 may be a processor itself, or may be an electronic device or system including a processor.

The storage device 1200 may include one or more nonvolatile memories 1210 and a memory controller 1230. Each of the nonvolatile memories 1210 may include a memory region for storing the data DAT provided from the host 1100. Each of the nonvolatile memories 1210 may output read data stored in the memory region for the host 1100. For example, when each of the nonvolatile memories 1210 includes a NAND-type flash memory, each of the nonvolatile memories 1210 may include a memory cell array that is arranged along a plurality of word lines and a plurality of bit lines.

However, the above example is not intended to limit the present disclosure. For another example, each of the nonvolatile memories 1210 may include one or more of various nonvolatile memories, such as a phase-change random access memory (PRAM), a magneto-resistive RAM (MRAM), a resistive RAM (ReRAM), ferroelectric RAM (FRAM), or the like. The configuration of each of the nonvolatile memories 1210 may be changed or modified in various ways.

The memory controller 1230 may control the overall operations of the storage device 1200. The memory controller 1230 may control operations of the nonvolatile memories 1210. Under the control of the memory controller 1230, write data provided from the host 1100 may be stored in the nonvolatile memories 1210 or read data stored in the nonvolatile memories 1210 may be provided to the host 1100.

For example, the host 1100 and the storage device 1200 may communicate with each other in compliance with one or more of various interface protocols, such as universal serial bus (USB), small computer system interface (SCSI), peripheral component interconnect express (PCIe), nonvolatile memory express (NVMe), mobile PCIe (M-PCIe), advanced technology attachment (ATA), parallel ATA (PATA), serial ATA (SATA), serial attached SCSI (SAS), integrated drive electronics (IDE), universal flash storage (UFS), Firewire, or the like.

The storage device 1200 may receive power PWR to operate. The power PWR may be provided to components of the storage device 1200 (e.g., the nonvolatile memories 1210 and the memory controller 1230), and the components of the storage device 1200 may operate based on the power PWR. For example, the power PWR may be provided from the host 1100. Alternatively, the power PWR may be provided from another component of the storage system 1000 (e.g., a battery) or from an external power source.

In some cases, supplying the power PWR may be interrupted, and thus an operation of the storage device 1200 may be ended or stopped. The operation of the storage device 1200 may be ended normally (e.g., in the case where an off command is provided from a user or the host 1100), or may be stopped abnormally (e.g., in the case where a battery is abruptly removed according to an abnormal sequence, for example, forcibly). The start and end of the operation of the storage device 1200 may be repeated depending on whether the power PWR is supplied or not.

Frequent repetitions of supplying the power PWR and interruption thereof may affect the performance and life span of the nonvolatile memories 1210, which is described in further detail below. Accordingly, in some example embodiments, the memory controller 1230 may manage operations of the nonvolatile memories 1210 differently according to power supply interruptions. The memory controller 1230 may manage a data amount (or amounts) of the write data and/or the read data. In addition, the memory controller 1230 may estimate a tendency for power supply interruptions to occur based on the data amount. The data amount may be a reference point for managing operations of the nonvolatile memories 1210.

In some example embodiments, the memory controller 1230 may include a memory-related section that is configured to manage the data amount, and to control the nonvolatile memories 1210. In some example embodiments, the memory controller 1230 may include a host-related section that is provided to monitor and control the operation of the storage device 1200 by the host 1100. Example operations of the memory-related section are described below with reference to FIGS. 2A to 15, and example operations of the host-related section are described below with reference to FIGS. 16 to 19.

In some example embodiments, the storage device 1200 may further include a buffer memory. The buffer memory may be included in the memory controller 1230, or may be provided separately from the memory controller 1230. For example, the buffer memory may include one or more of various volatile memories, such as a static RAM (SRAM), a dynamic RAM (DRAM), a synchronous DRAM (SDRAM), or the like, but the present disclosure is not limited thereto. The buffer memory may be implemented with other types of memories that are capable of being randomly accessible and operating at a high speed.

The buffer memory may temporarily store data to be stored in the nonvolatile memories 1210. The buffer memory may temporarily store data processed, or to be processed, by the memory controller 1230. For example, the buffer memory may temporarily store information of a mapping table that indicates a correspondence relationship between physical addresses and logical addresses of the nonvolatile memories 1210. For example, the buffer memory may temporarily store internal management data (e.g., data used to manage the performance of the storage device 1200, or the like) that is irrelevant to the host 1100. In other words, the buffer memory may operate as a cache memory of the storage device 1200.

Figure 2A:
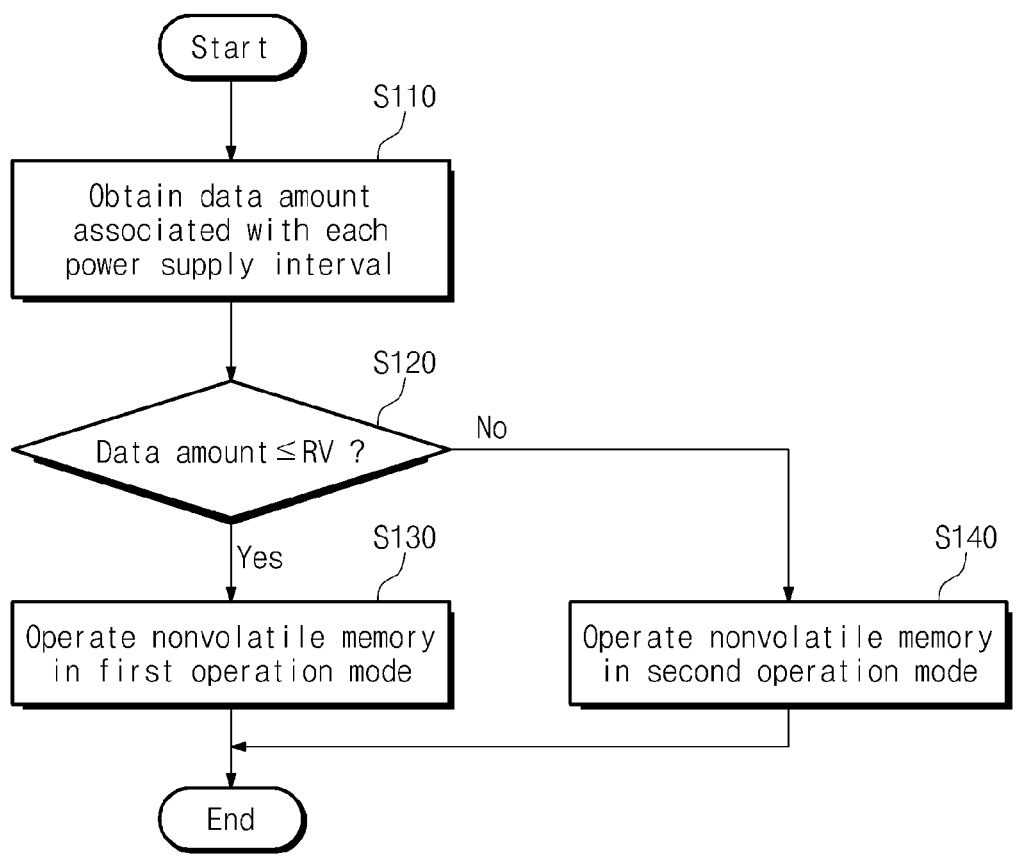
FIG. 2A is a flow chart illustrating a technique for managing operations of nonvolatile memories included in a storage device of FIG. 1.

FIG. 2A is a flow chart illustrating a technique for managing operations of nonvolatile memories included in a storage device of FIG. 1. The procedure of FIG. 2A may be processed by the memory-related section of the memory controller 1230 of FIG. 1. Reference is now made to FIGS. 1 and 2A.

In operation S110, the memory controller 1230 may obtain a data amount of write data stored in one or more nonvolatile memories 1210 and/or a data amount of read data output from the nonvolatile memories 1210. The data amount may be calculated with respect to power supply intervals. More specifically, the data amount may be determined between a point in time where power PWR is supplied and a point in time where the supplied power PWR is interrupted. The data amount may be obtained, for example, based on header information. Alternatively or in addition, the data amount may be obtained based on metadata corresponding to the write data and/or the read data. The power supply intervals and techniques for calculating the data amount are described in detail below with reference to FIGS. 3, 5 and 11.

The memory controller 1230 may manage information associated with the data amount. For example, the information associated with the data amount may be buffered in a buffer memory of the storage device 1200. In some example embodiments, to continuously manage the information associated with the data amount, the nonvolatile memories 1210 may store the information associated with the data amount under the control of the memory controller 1230.

In operation S120, the memory controller 1230 may determine whether the data amount obtained in operation S110 is less than or equal to a reference value RV. For example, the reference value RV may be determined considering a level of influence on life span of the nonvolatile memories 1210 due to repetition of occurrences of the power PWR being supplied followed by an interruption of the supplied power. In other words, the reference value RV may be dependent on a level of influence on life span of the nonvolatile memories 1210 due to repetition of occurrences of the power PWR being supplied followed by an interruption of the supplied power. Alternatively or additionally, the reference value RV may be determined, for example, considering life span of the storage device 1200 that may be guaranteed by the nonvolatile memories 1210. Such information associated with the life span of the nonvolatile memories 1210 may be obtained through various tests that are taken while or after the storage device 1200 is manufactured.

The reference value RV may be stored in the nonvolatile memories 1210 or another memory in advance, during or after the storage device 1200 is manufactured. Alternatively, the reference value RV may be provided from the host 1100, or may be calculated by the memory controller 1230, during the operations of the storage device 1200. The reference value RV may be a fixed or a variable value. The reference value RV may be modified or changed in variety of ways according to various implementations of the example embodiments.

When the data amount obtained in operation S110 is less than or equal to the reference value RV, in operation S130, the memory controller 1230 may control the nonvolatile memories 1210 such that the nonvolatile memories 1210 operate in a first operation mode. On the other hand, when the data amount obtained in operation S110 is greater than the reference value RV, in operation S140, the memory controller 1230 may control the nonvolatile memories 1210 such that the nonvolatile memories 1210 operate in a second operation mode. The first operation mode and the second operation mode may be different from each other. That is, the memory controller 1230 may control the nonvolatile memories 1210 differently based on the data amount.

As described below with reference to FIGS. 3 and 4, the data amount may be associated with a tendency for interruptions to occur of the power PWR to the storage device 1200. For example, when a data amount corresponding to a specific power supply interval is small, it is likely that an operation time of the storage device 1200 is short, and occurrences of the power PWR being supplied followed by an interruption of the supplied power are frequently repeated. On the other hand, when a data amount corresponding to a specific power supply interval is large, it is likely that an operation time of the storage device 1200 and a time for supplying the power PWR are long (i.e., power supply interruptions are not frequent). Accordingly, when the appropriate reference value RV is employed, the tendency of power supply interruptions to occur in the storage device 1200 may be estimated based on whether the data amount is less than or equal to the reference value RV.

In operations S130 and S140, operations of the nonvolatile memories 1210 may be controlled differently based on the data amount. The first operation mode of operation S130 may be an operation mode to appropriately manage the nonvolatile memories 1210 when the data amount is small (i.e., when it is likely that occurrences of the power PWR being supplied followed by an interruption of the supplied power are frequently repeated). The second operation mode of operation S140 may be an operation mode to appropriately manage the nonvolatile memories 1210 when the data amount is large (i.e., when it is likely that a time for supplying the power PWR is long). Example methods to manage operations of the nonvolatile memories 1210 in each of the first operation mode and the second operation mode are described below with reference to FIGS. 6 to 10.

With reference to FIG. 2A, the memory controller 1230 determines an operation mode of the nonvolatile memories 1210 among the first and second operation modes based on the data amount. In some other example embodiments, the memory controller 1230 may operate the nonvolatile memories 1210 in a default operation mode that is different from both the first and second operation modes, and may change the operation mode of the nonvolatile memories 1210 based on the data amount. However, the example embodiments may be changed or modified in various ways. In some example embodiments, the memory controller 1230 may operate the nonvolatile memories 1210 initially in the second operation mode, and may select the first operation mode in response to obtaining a data amount that is less than or equal to the reference value RV. In some example embodiments, the memory controller 1230 may operate the nonvolatile memories 1210 initially in the first operation mode, and may select the second operation mode in response to obtaining a data amount that is greater than the reference value RV.

Figure 2B:
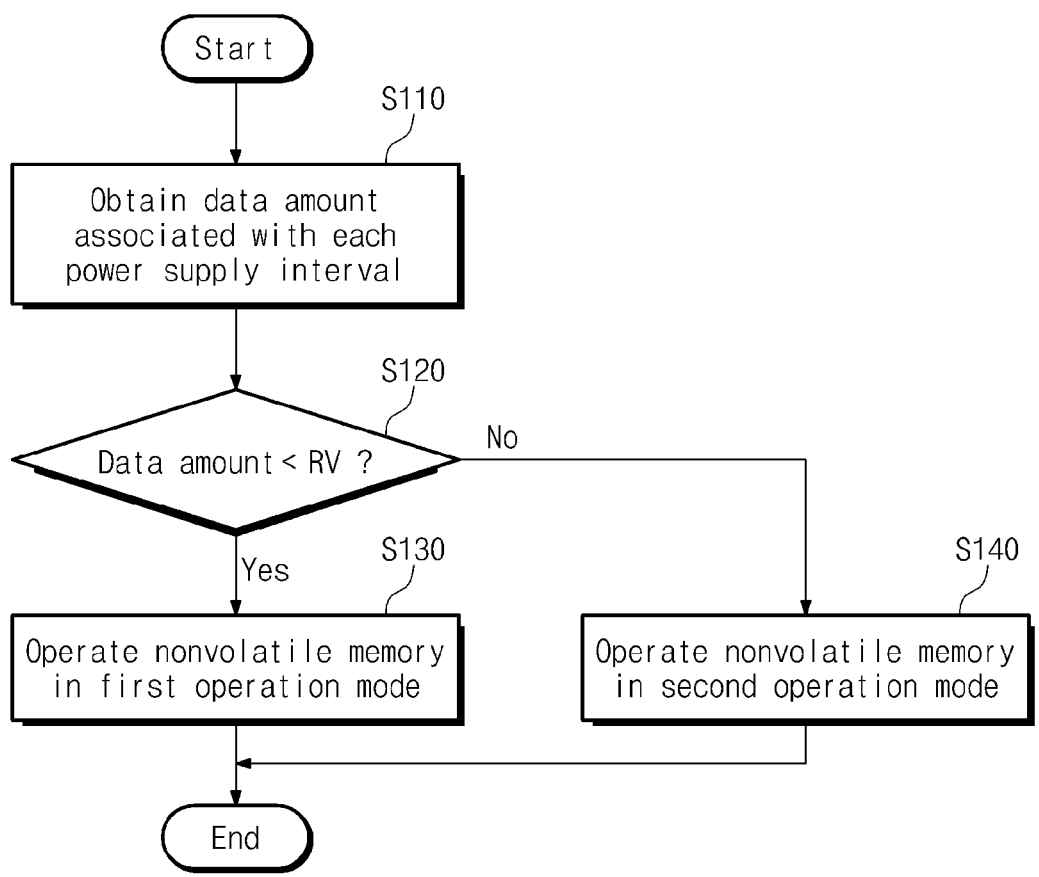
FIG. 2B is a flow chart illustrating another technique for managing operations of nonvolatile memories included in a storage device of FIG. 1.

FIG. 2B is a flow chart illustrating another technique for managing operations of nonvolatile memories included in a storage device of FIG. 1. FIG. 2B is nearly identical to FIG. 2A except for the step S120. In FIG. 2B, in operation S120, the memory controller 1230 may determine whether the data amount obtained in operation S110 is less than a reference value RV (rather than less than or equal to the reference value RV). It will be understood that where the phrase "less than or equal to" is used herein, such phrase can be replaced with "less than" without departing from the inventive concepts disclosed herein. Similarly, it will be understood that the phrase "greater than" can be replaced with "greater than or equal to" without departing from the inventive concepts disclosed herein. In other words, when performing a comparison operation, the memory controller 1230 is not limited to only performing an inclusive comparison operation, or only performing an exclusive comparison operation. Rather, such references to comparison operations can encompass the various possibilities that are substantially the same as what are described herein.

Figure 3:
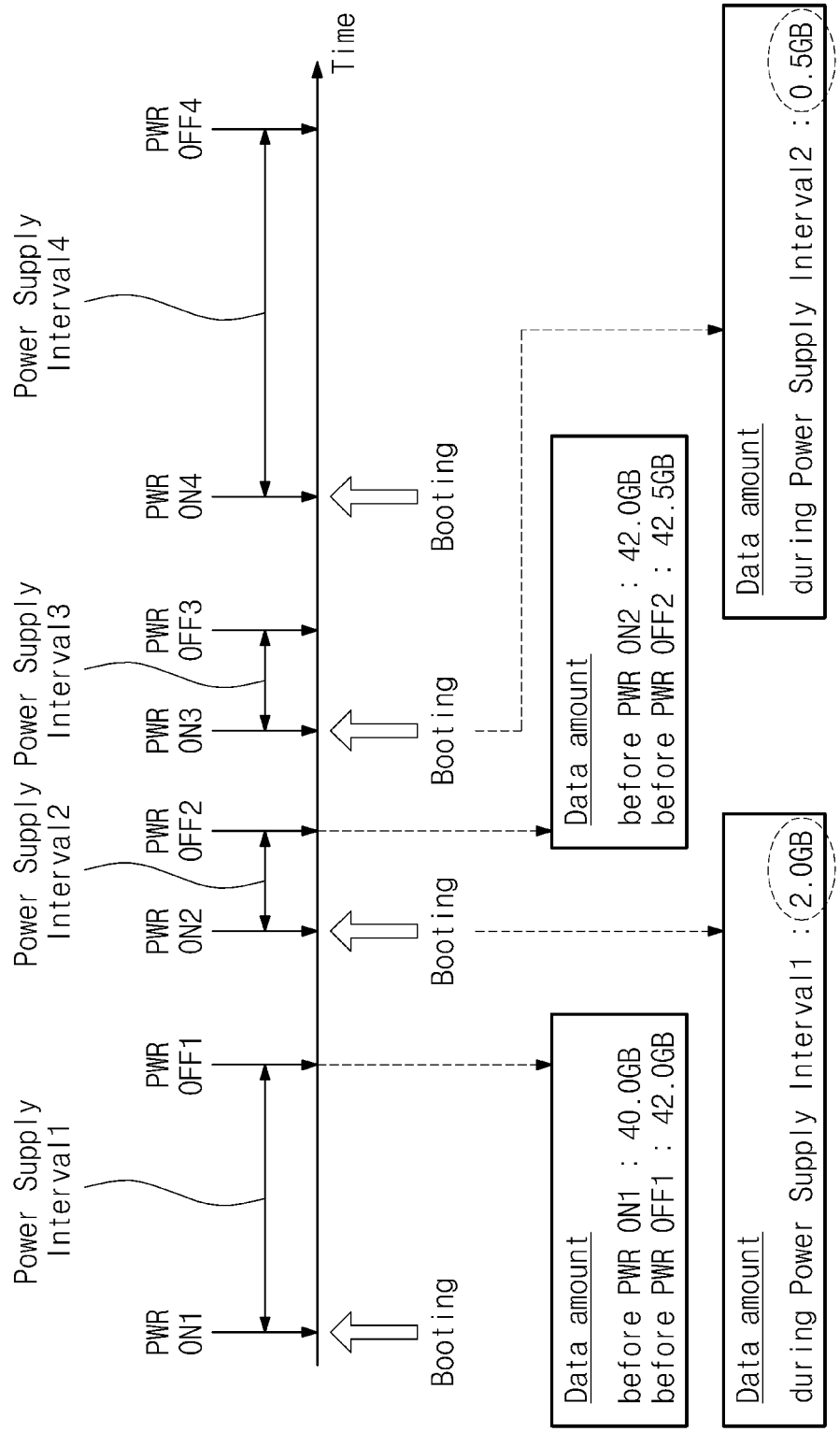
FIG. 3 is a conceptual diagram showing an operation to obtain a data amount in the procedure of FIG. 2A.

FIG. 3 is a conceptual diagram showing an operation to obtain a data amount in the procedure of FIG. 2A. An operation to obtain a data amount of write data stored in one or more nonvolatile memories 1210 is described below with reference to FIG. 3. Reference is now made to FIGS. 1 through 3.

FIG. 3 shows four events, for example, where power PWR is supplied to a storage device 1200 and four events where the power PWR supplied to the storage device 1200 is interrupted. There may be four repeated power supply intervals in which the power PWR is supplied followed by an interruption of the supplied power.

For example, at a point in time where the power PWR is supplied (i.e., the power PWR begins to be supplied), a booting operation may be performed in response to supplying the power PWR. The booting operation may be performed to initialize (or reset) an operation of the storage device 1200 and to load data required to operate the storage device 1200.

In some example embodiments, the memory controller 1230 may obtain the data amount of write data stored in the nonvolatile memories 1210 when the booting operation is performed (e.g., operation S110 of FIG. 2A). The data amount may be obtained with respect to each power supply interval. The memory controller 1230 may calculate the data amount by itself, for example, referring to metadata. Alternatively, as described below with reference to FIG. 18, the data amount may be provided from the host 1100.

For example, at a first point in time where the power PWR is supplied (i.e., the power PWR begins to be supplied), a booting operation may be performed in response to the power PWR being supplied. Afterwards, a first point in time where supplying the power PWR is interrupted may occur, and there may be a first power supply interval between the first point in time where the power PWR is supplied and the first point in time where supplying the power PWR is interrupted. For the sake of explanation, it will be assumed that the data amount of write data stored in the nonvolatile memories 1210 before, or at, the first point in time where the power PWR is supplied is 40.0 gigabytes (GB), and the data amount of write data stored in the nonvolatile memories 1210 before, or at, the first point in time where supplying the power PWR is interrupted is 42.0 GB. According to this assumption, the data amount of write data stored in the nonvolatile memories 1210 during the first power supply interval may be 2.0 GB (i.e., 42.0 GB minus 40.0 GB).

At a second point in time where the power PWR is supplied, a booting operation may be performed in response to the power PWR being supplied. When the booting operation is performed, the memory controller 1230 may obtain a data amount (i.e., 2.0 GB) corresponding to the most recent power supply interval (i.e., the first power supply interval) before the power PWR is supplied. The memory controller 1230 may compare the obtained data amount with a reference value (e.g., operation S120 of FIG. 2A), and may control operations of the nonvolatile memories 1210 differently based on the comparison result (e.g., operations S130 and S140 of FIG. 2A). For example, when the reference value is set to 1.0 GB, the nonvolatile memories 1210 may operate in the second operation mode.

Subsequently, a second point in time where supplying the power PWR is interrupted may occur, and a second power supply interval may be obtained between the second point in time where the power PWR is supplied and the second point in time where supplying the power PWR is interrupted. As assumed above, the data amount of write data stored in the nonvolatile memories 1210 before the second point in time where the power PWR is supplied may be 42.0 GB. For the sake of explanation, it will be assumed that the data amount of write data stored in the nonvolatile memories 1210 before the second point in time where supplying the power PWR is interrupted is 42.5 GB. According to this assumption, the data amount of write data stored in the nonvolatile memories 1210 during the second power supply interval may be 0.5 GB (i.e., 42.5 GB minus 42.0 GB).

At a third point in time where the power PWR is supplied, a booting operation may be performed in response to the power PWR being supplied. When the booting operation is performed, the memory controller 1230 may obtain a data amount (i.e., 0.5 GB) corresponding to the most recent power supply interval (i.e., the second power supply interval) before the power PWR is supplied. The memory controller 1230 may control operations of the nonvolatile memories 1210 based on the obtained data amount. For example, when the reference value RV is set to 1.0 GB, the nonvolatile memories 1210 may operate in the first operation mode.

In such a manner, the memory controller 1230 may obtain a data amount corresponding to each power supply interval when a booting operation is performed. For the sake of brevity, detailed descriptions associated with a third power supply interval between the third point in time where the power PWR is supplied and a third point in time where supplying the power PWR is interrupted, and a fourth power supply interval between a fourth point in time where the power PWR is supplied and a fourth point in time where supplying the power PWR is interrupted, are omitted.

The above-described operation may be applied in a similar fashion to obtain the data amount of read data output from the nonvolatile memories 1210. According to the above operation, the memory controller 1230 may obtain a data amount of at least one of write data or read data when a booting operation is performed. However, the above-described operation is provided as an example for the sake of explanation, and the present disclosure is not limited thereto. For example, the number of occurrences of events, the number of power supply intervals, and a value of the data amount may be modified or changed in various ways.

FIG. 4 is a table showing a relationship between a data amount obtained according to an example embodiment and power supply interruptions. Reference is now made to FIGS. 1 through 4.

Referring to FIG. 3, the lengths of power supply intervals may be different from one another. For example, the lengths of some power supply intervals such as a second power supply interval and a third power supply interval may be relatively short. When a length of a power supply interval is short, an operation time of the storage device 1200 may be short. Accordingly, a data amount corresponding to a power supply interval having a short length may be relatively small.

When a length of a power supply interval is short, occurrences of the power PWR being supplied followed by an interruption of the supplied power may be frequently repeated. Referring to the second power supply interval and the third power supply interval of FIG. 3, it may be understood that occurrences of the power PWR being supplied followed by an interruption of the supplied power are relatively frequent. Accordingly, when a data amount corresponding to a specific power supply interval is small, it may be inferred that occurrences of the power PWR being supplied followed by an interruption of the supplied power are frequently repeated for the specific power supply interval.

On the other hand, the lengths of some power supply intervals such as a first power supply interval and a fourth power supply interval may be relatively long. When the length of the power supply interval is relatively long, an operation time of the storage device 1200 may be long. Accordingly, a data amount corresponding to a power supply interval of a long length may be relatively large. In addition, when the length of the power supply interval is long, occurrences of the power PWR being supplied followed by an interruption of the supplied power may be relatively rare. Accordingly, when a data amount corresponding to a specific power supply interval is large, it may be inferred that occurrences of the power PWR being supplied followed by an interruption of the supplied power are rare for the specific power supply interval.

As a result, a data amount for each power supply interval may be associated with a tendency of power supply interruptions to occur. Meanwhile, a tendency of power supply interruptions occurring may affect the performance and life span of one or more nonvolatile memories 1210, which is described in detail below. For this reason, nonvolatile memories 1210 may be managed differently according to a tendency of power supply interruptions to occur. In some example embodiments, a data amount for each power supply interval may affect or cause different control operations of the nonvolatile memories 1210.

Figure 5:
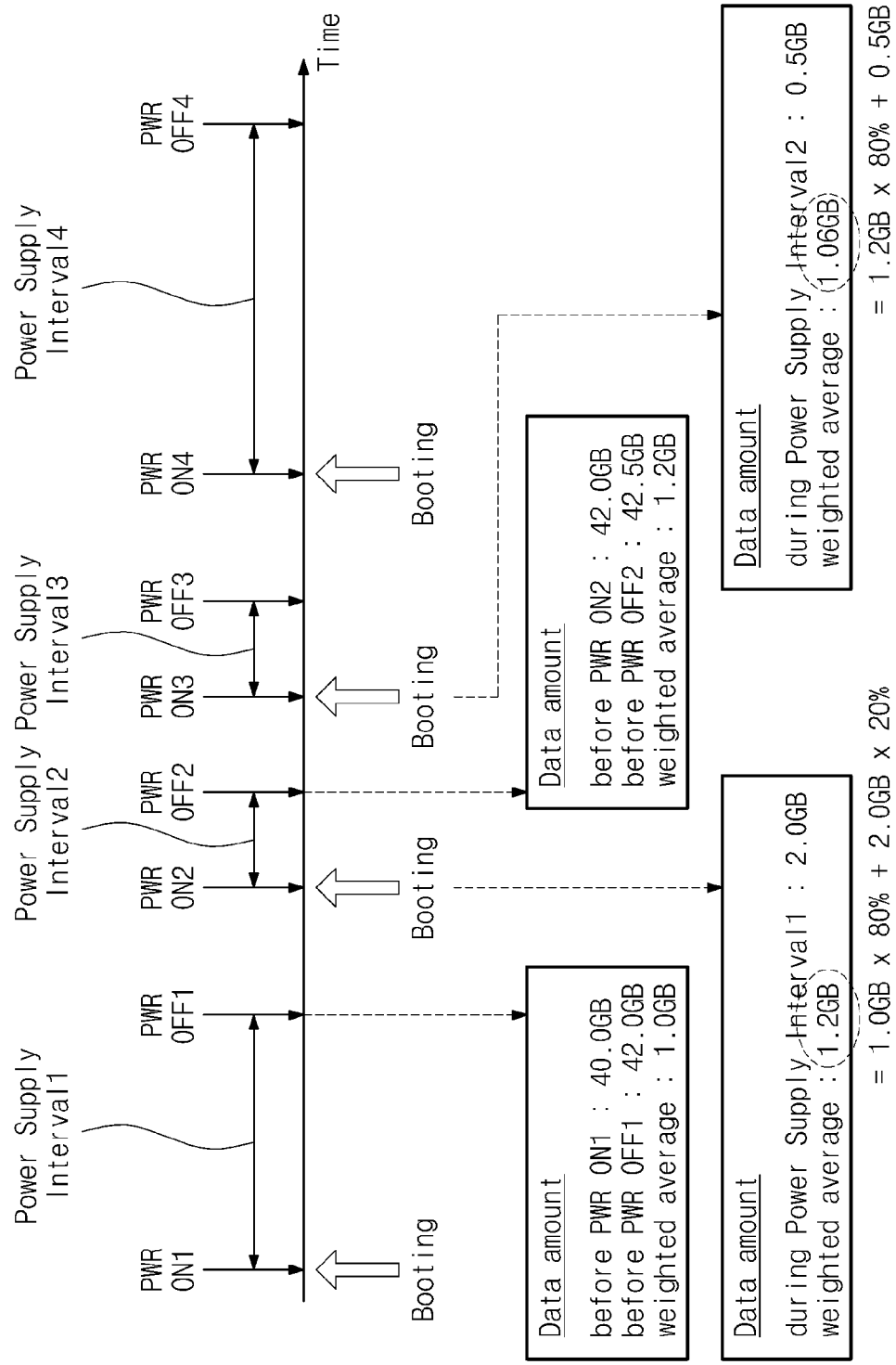
FIG. 5 is a conceptual diagram showing an operation to obtain a data amount associated with the technique of FIG. 2A.

FIG. 5 is a conceptual diagram showing an operation to obtain a data amount in the procedure of FIG. 2A. An operation to obtain a data amount of write data stored in one or more nonvolatile memories 1210 is described below with reference to FIG. 5. Reference is now made to FIGS. 1, 2A, and 5.

Similar to FIG. 3, FIG. 5 shows four events where power PWR is supplied (i.e., the power PWR begins to be supplied) and four events where the power PWR supplied to the storage device 1200 is interrupted. Four power supply intervals are shown as occurrences of the power PWR being supplied followed by an interruption of the supplied power are repeated.

For example, at a point in time where the power PWR is supplied, a booting operation may be performed in response to the power PWR being supplied. In some example embodiments, the memory controller 1230 may obtain the data amount of the write data stored in the nonvolatile memories 1210 when the booting operation is performed (e.g., operation S110 of FIG. 2A). The data amount may be obtained with respect to each of the power supply intervals. For example, when the booting operation is performed, the memory controller 1230 may obtain a data amount corresponding to the most recent power supply interval before the power PWR is supplied.

According to the example described with reference to FIG. 3, the nonvolatile memories 1210 may be managed based on the data amount itself corresponding to the most recent power supply interval. On the other hand, in the example illustrated in FIG. 5, the data amount that is relied on to manage the nonvolatile memories 1210 may be calculated by a "weighted average." In some example embodiments, the data amount may be obtained by calculating a weighted average under the condition where a first weight is allocated to the most recent data amount corresponding to the most recent power supply interval, and a second weight is allocated to a previous data amount corresponding to one or more power supply intervals other than the most recent power supply interval.

For example, at a first point in time where the power PWR is supplied, a booting operation may be performed in response to the power PWR being supplied. Afterwards, a first point in time where supplying the power PWR is interrupted may occur, and a first power supply interval may be obtained between the first point in time where the power PWR is supplied and the first point in time where supplying the power PWR is interrupted.

For the sake of explanation, it will be assumed that the data amount of write data stored in the nonvolatile memories 1210 before, or at, the first point in time where the power PWR is supplied is 40.0 GB, and the data amount of write data stored in the nonvolatile memories 1210 before, or at, the first point in time where supplying the power PWR is interrupted is 42.0 GB. According to this assumption, the data amount of write data stored in the nonvolatile memories 1210 during the first power supply interval may be 2.0 GB (i.e., 42.0 GB minus 40.0 GB). In addition, it will be assumed that a data amount corresponding to one or more power supply intervals before the first point in time where supplying the power PWR is interrupted is 1.0 GB.

At a second point in time where the power PWR is supplied, a booting operation may be performed in response to the power PWR being supplied. When the booting operation is performed, the memory controller 1230 may obtain a data amount (i.e., 2.0 GB) corresponding to the most recent power supply interval (i.e., the first power supply interval) before the power PWR is supplied. In addition, the memory controller 1230 may obtain a previous data amount (i.e., 1.0 GB) corresponding to one or more power supply intervals other than the most recent power supply interval.

For example, the memory controller 1230 may calculate a weighted average by assigning a first weight (e.g., 20%) to the most recent data amount (i.e., 2.0 GB) and assigning a second weight (e.g., 80%) to a previous data amount (i.e., 1.0 GB) (i.e., (2.0 GB×20%)+(1.0 GB×80%)=1.2 GB). The calculated weighted average (i.e., 1.2 GB) may be used as a data amount that is relied on to manage the nonvolatile memories 1210. The memory controller 1230 may compare the calculated data amount with a reference value (e.g., operation S120 of FIG. 2A), and may control operations of the nonvolatile memories 1210 differently based on the comparison result (e.g., operations S130 and S140 of FIG. 2A). For example, when the reference value is set to 1.1 GB, the nonvolatile memories 1210 may operate in the second operation mode.

Subsequently, a second point in time where supplying the power PWR is interrupted may occur, and a second power supply interval may be obtained between the second point in time where the power PWR is supplied and the second point in time where supplying the power PWR is interrupted. As assumed above, the data amount of write data stored in the nonvolatile memories 1210 before the second point in time where the power PWR is supplied may be 42.0 GB. For the sake of explanation, it will be assumed that the data amount of write data stored in the nonvolatile memories 1210 before, or at, the second point in time where supplying the power PWR is interrupted may be 42.5 GB. According to this assumption, the data amount of write data stored in the nonvolatile memories 1210 during the second power supply interval may be 0.5 GB (i.e., 42.5 GB minus 42.0 GB).

At a third point in time where the power PWR is supplied, a booting operation may be performed in response to the power PWR being supplied. When the booting operation is performed, the memory controller 1230 may obtain the most recent data amount (i.e., 0.5 GB) corresponding to the most recent power supply interval (i.e., the second power supply interval) before the power PWR is supplied. In addition, the memory controller 1230 may obtain a previous data amount (i.e., 1.2 GB) corresponding to one or more power supply intervals other than the most recent power supply interval.

For example, the memory controller 1230 may calculate a weighted average by assigning a first weight (e.g., 20%) to the most recent data amount (i.e., 0.5 GB) and a second weight (e.g., 80%) to a previous data amount (i.e., 1.2 GB) (i.e., (0.5 GB×20%)+(1.2 GB×80%)=1.06 GB). The calculated weighted average (i.e., 1.06 GB) may be used as a data amount that is relied on to manage the nonvolatile memories 1210. The memory controller 1230 may compare the calculated data amount with a reference value (e.g., operation S120 of FIG. 2A) and may control operations of the nonvolatile memories 1210 differently based on the comparison result (e.g., operations S130 and S140 of FIG. 2A). For example, when the reference value is set to 1.1 GB, the nonvolatile memories 1210 may operate in the first operation mode. On the other hand, when the reference value is set to 1.0 GB, the nonvolatile memories 1210 may operate in the second operation mode.

In such a manner, the memory controller 1230 may obtain a data amount corresponding to each power supply interval when a booting operation is performed. In the example illustrated in FIG. 5, the memory controller 1230 may update information associated with a previous data amount based on the most recent data amount calculated with respect to the most recent power supply interval before the power PWR is supplied. In addition, the memory controller 1230 may control operations of the nonvolatile memories 1210 differently based on the updated information.

For the sake of brevity, detailed descriptions associated with a third power supply interval between a third point in time where the power PWR is supplied and a third point in time where supplying the power PWR is interrupted, and a fourth power supply interval between a fourth point in time where the power PWR is supplied and a fourth point in time where supplying the power PWR is interrupted are omitted. The above-described operation may be applied in a similar fashion to obtain the data amount of read data output from the nonvolatile memories 1210. However, the above-described operation is provided for the sake of explanation, and the present disclosure is not limited thereto. For example, the number of occurrence of events, the number of power supply intervals, and a value of a data amount may be modified or changed in various ways.

In some cases, unlike the description given with respect to FIG. 4, even though a length of a specific power supply interval is long, a data amount corresponding to the power supply interval may be small. In such a case, according to the example described with reference to FIG. 5, data amounts for all power supply intervals may be considered, rather than considering only one power supply interval (e.g., the most recent power supply interval). According to the example described with reference to FIG. 5, exceptional influence due to the case where a data amount generated during a long power supply interval is small may be somewhat canceled out. As described with reference to FIG. 5, when the first weight is less than the second weight, cancellation may be more pronounced.

However, the example described with reference to FIG. 5 is intended to enhance understanding of the various embodiments disclosed herein, and the present disclosure is not limited by FIG. 5. In some example embodiments, to dynamically consider the variation on the data amount(s), the first weight may be set to be greater than the second weight. In addition, a value of each of the first and second weights may have a value different from 20% or 80%. A value of each of the first and second weights may be a fixed value or a variable value. In some cases, a value of each of the first and second weights may be changed dynamically according to an operation condition of the storage device for each power supply interval. The first and second weights may be modified or changed in various ways according to implementation of the example embodiments.

Figure 6:
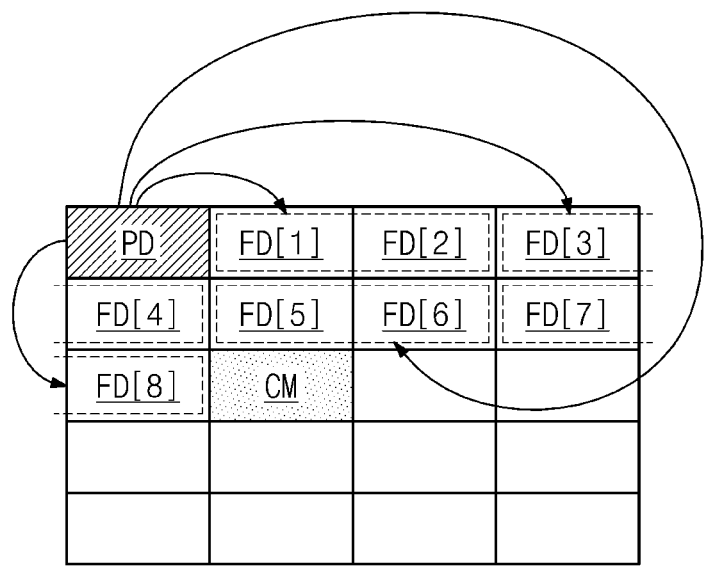
FIGS. 6 to 10 are conceptual diagrams showing methods to manage operations of nonvolatile memories in each of a first operation mode and a second operation mode associated with the technique of FIG. 2A.
Figure 7:
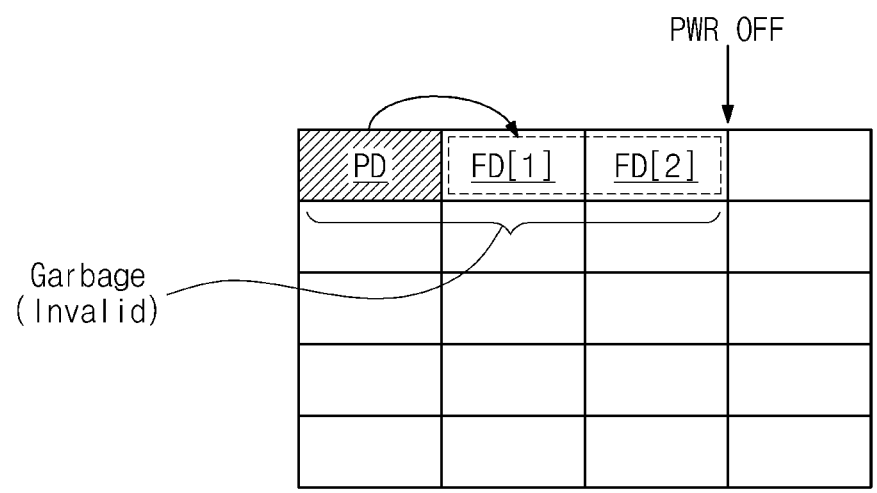
Figure 8:
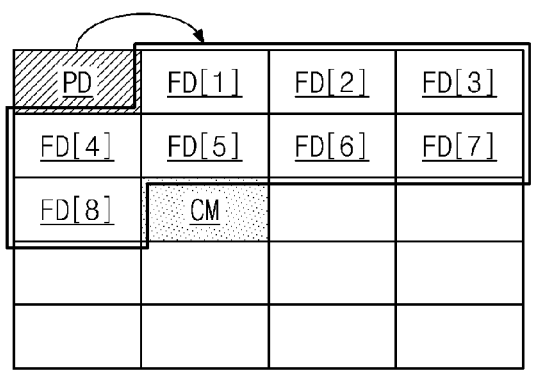

FIGS. 6 to 8 are conceptual diagrams showing methods to manage operations of nonvolatile memories in each of a first operation mode and a second operation mode associated with the technique of FIG. 2A. Reference is now made to FIGS. 1, 6, and 8.

An example that demonstrates a manner to store data in one or more nonvolatile memories 1210 (hereinafter referred to as a "type A manner") is described below with respect to FIGS. 6 to 8. In FIGS. 6 to 8, a square-shaped box represents a memory region included in nonvolatile memories 1210. For example, the box may represent a page unit or a block unit of the nonvolatile memories 1210, but the present disclosure is not limited thereto.

First, referring to FIG. 6, the type A manner is described below for a second operation mode that is performed when a data amount corresponding to a specific power supply interval is large (i.e., when occurrences of the power PWR being supplied followed by an interruption of the supplied power are rarely repeated). In the second operation mode, the memory controller 1230 may control a journaling operation for storing full data FD[1] to FD[8] in the nonvolatile memories 1210 based on partial data PD.

For example, the full data FD[1] to FD[8] may include metadata or mapping data, and the partial data PD may correspond to a changed portion of the metadata or mapping data. When the journaling operation is performed, the partial data PD may first be stored in the nonvolatile memories 1210. Afterwards, the memory controller 1230 may control the nonvolatile memories 1210 such that the full data FD[1] to FD[8] is stored therein based on the partial data PD.

In the second operation mode, the journaling operation may be divisionally performed, by the memory controller 1230, in response to each of a plurality of commands provided from a host 1100. For example, some portions FD[1] and FD[2] among the full data FD[1] to FD[8] may be stored in the nonvolatile memories 1210 in response to a first command provided from the host 1100, and some other portions FD[3] and FD[4] among the full data FD[1] to FD[8] may be stored in the nonvolatile memories 1210 in response to a second command provided from the host 1100.

In such a manner, remaining portions FD[5] to FD[8] may be stored in the nonvolatile memories 1210 in response to a third command and a fourth command provided from the host 1100. After the whole full data FD[1] to FD[8] is stored in the nonvolatile memories 1210, a completion mark CM indicating that storing the full data FD[1] to FD[8] is completed may be stored in the nonvolatile memories 1210.

The journaling operation may allow the storage device 1200 to operate efficiently. This is because, as a write operation is divisionally performed in response to a plurality of commands, an operation of the storage device 1200 may be flexibly scheduled considering the load on the data transmission.

However, when occurrences of the power PWR being supplied followed by an interruption of the supplied power are frequently repeated, the journaling operation may affect the life span of the nonvolatile memories 1210. As illustrated in FIG. 7, supplying the power PWR is interrupted after some portions FD[1] and FD[2] among the full data FD[1] to FD[8] is stored in the nonvolatile memories 1210.

When supplying the power PWR is interrupted even though the full data FD[1] to FD[8] is not completely stored in the nonvolatile memories 1210, the completion mark CM may not be stored in the nonvolatile memories 1210. In this case, the partial data PD and the stored data FD[1] and FD[2] may be regarded as garbage data in the next power supply interval. In the next power supply interval, the garbage data may become invalid, and a journaling operation may be performed again on other memory regions.

Accordingly, when occurrences of the power PWR being supplied followed by an interruption of the supplied power are frequently repeated, the journaling operation may cause an increase in the number of program/erase (P/E) cycles due to storing and erasing operations on the garbage data, and as a result, the life span of the nonvolatile memories 1210 may be shortened faster. Variation of the life span of the nonvolatile memories 1210 due to repetitions of occurrences of the power PWR being supplied followed by an interruption of the supplied power may be described with reference to the following equation 1.

$$WL+(FQ \times LS) \leq G\_WL \qquad \text{[Equation 1]}$$

In the above equation 1, "WL" denotes the life span of the nonvolatile memories 1210 consumed until a specific point in time, "FQ" denotes a repetition frequency of occurrences of the power PWR being supplied followed by an interruption of the supplied power, and "LS" denotes the life span of the nonvolatile memories 1210 consumed when supplying the power PWR and power supply interruption occur once. Accordingly, the left side of the above equation 1 may indicate a sum of the life span of the nonvolatile memories 1210 consumed until a specific point in time, and the life span of the nonvolatile memories 1210 to be consumed by repetitions of occurrences of the power PWR being supplied followed by an interruption of the supplied power.

In addition, in the above equation 1, "G_WL" may denote the whole life span of the nonvolatile memories 1210. Accordingly, the left side of the above equation 1 may be less than or equal to the right side thereof.

When a value of "FQ" increases (i.e., when occurrences of the power PWR being supplied followed by an interruption of the supplied power are frequently repeated), it may be necessary to decrease a value of "LS" to satisfy the equation 1. However, if a journaling operation of FIG. 6 is employed, an amount of garbage data may increase as described with reference to FIG. 7. Rather, the journaling operation may cause an increase in the value of "LS." For this reason, when occurrences of the power PWR being supplied followed by an interruption of the supplied power are frequently repeated, the nonvolatile memories 1210 may be differently managed in some example embodiments.

Referring to FIG. 8, the type A manner is described below for a second operation mode that is performed when a data amount corresponding to a specific power supply interval is small (i.e., when occurrences of the power PWR being supplied followed by an interruption of the supplied power are frequently repeated). In the first operation mode, the full data FD[1] to FD[8] may be stored, by the memory controller 1230, in the nonvolatile memories 1210 in response to one command provided from the host 1100. In addition, the completion mark CM may also be stored in the nonvolatile memories 1210 in response to the one command That is, in the first operation mode, the full data FD[1] to FD[8] and the completion mark CM may be completely stored in the nonvolatile memories 1210 in response to one command.

In the first operation mode, the full data FD[1] to FD[8] may be stored at once, instead of being divisionally stored, and thus generation of the garbage data due to power supply interruption is minimized. Accordingly, when occurrences of the power PWR being supplied followed by an interruption of the supplied power are frequently repeated, the life span of the nonvolatile memories 1210 may be slowly shortened.

In FIG. 8, it is illustrated that the full data FD[1] to FD[8] is stored based on the partial data PD. However, in some example embodiments, the full data FD[1] to FD [8] may be directly stored in the nonvolatile memories 1210 without the partial data PD, to minimize shortening of the life span of the nonvolatile memories 1210.

Figure 9:
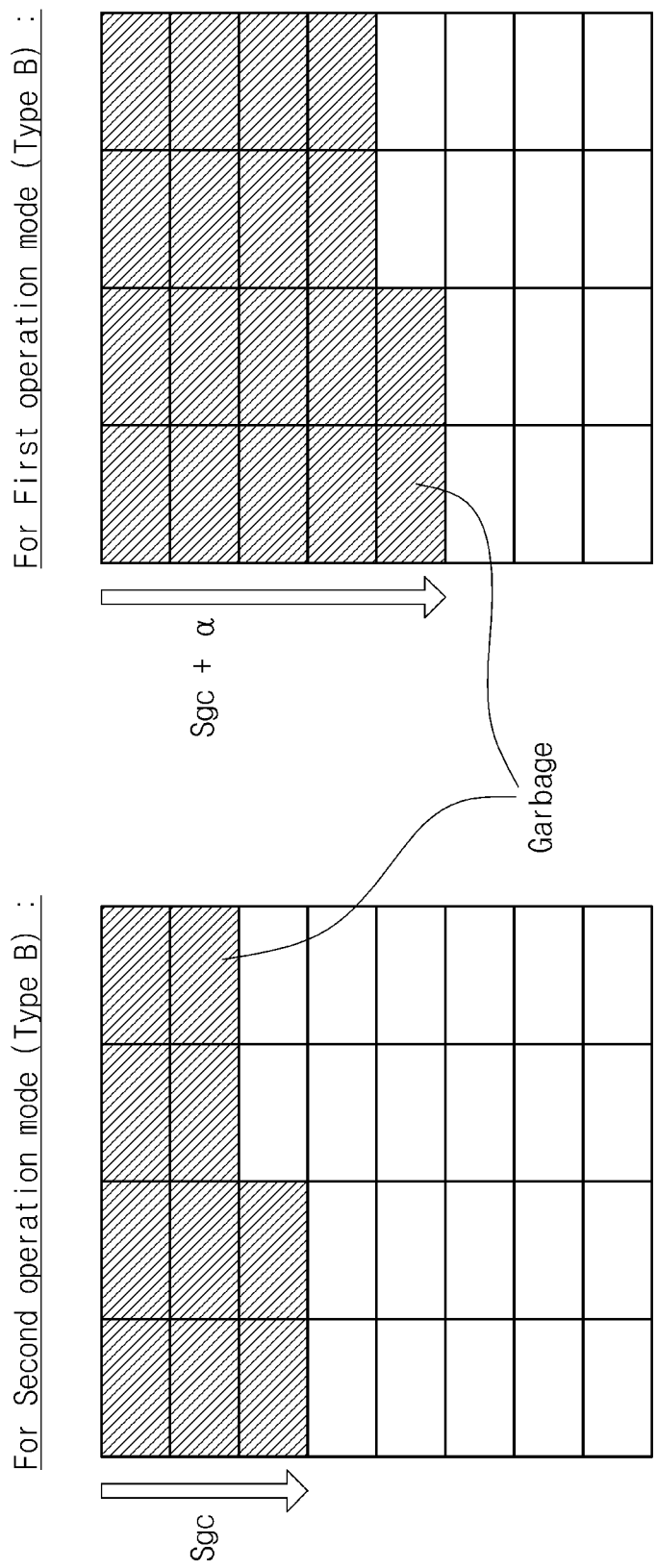

FIG. 9 is a conceptual diagram showing a method to manage operations of nonvolatile memories in each of a first operation mode and a second operation mode of FIG. 2A. Reference is now made to FIGS. 1 and 9.

Referring to FIG. 9, an example that demonstrates a manner to perform a garbage collection operation in one or more nonvolatile memories 1210 (hereinafter referred to as a "type B manner") is described below. The garbage collection operation may be performed, for example, to secure free blocks of the nonvolatile memories 1210 by cleaning garbage data up, and to efficiently manage the nonvolatile memories 1210.

In FIG. 9, a square-shaped box represents a memory region included in the nonvolatile memories 1210. A shaded box may represent a memory region that stores garbage data. For example, the box may represent a page unit or a block unit of the nonvolatile memories 1210, but the present disclosure is not limited thereto.

In the second operation mode performed when a data amount corresponding to a specific power supply interval is large (i.e., when occurrences of the power PWR being supplied followed by an interruption of the supplied power are rarely repeated), the garbage collection operation may be performed at speed of "Sgc." On the other hand, in the first operation mode performed when a data amount corresponding to a specific power supply interval is small (i.e., when occurrences of the power PWR being supplied followed by an interruption of the supplied power are frequently repeated), the garbage collection operation may be performed at speed of "Sgc+α," which is faster than "Sgc."

An amount of the garbage data may increase when occurrences of the power PWR being supplied followed by an interruption of the supplied power are frequently repeated. For example, as described with reference to FIGS. 6 and 7, there are times when only some portions of data are stored without a completion mark CM. When the amount of the garbage data increases, the amount of free blocks may decrease and the operation performance of the storage device 1200 may be degraded. For this reason, when occurrences of the power PWR being supplied followed by an interruption of the supplied power are frequently repeated, it may be necessary to differently manage the nonvolatile memories 1210 to process the garbage data.

Accordingly, the speed of the garbage collection operation performed in the first operation mode may be faster than that performed in the second operation mode. The memory controller 1230 may employ different garbage collection schemes for the first operation mode versus the second operation mode. For example, a garbage collection scheme of a fast speed may be employed for the first operation mode, and a garbage collection scheme with a slow speed but high efficiency may be employed for the second operation mode.

Figure 10:
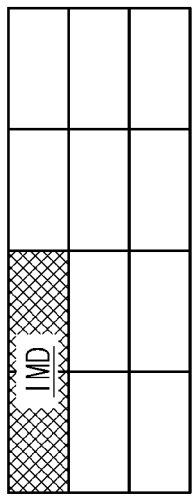
Figure 10:
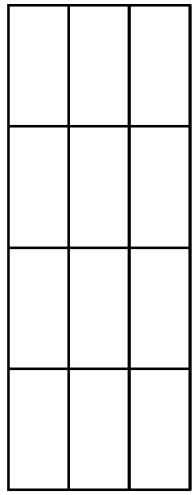
Figure 10:
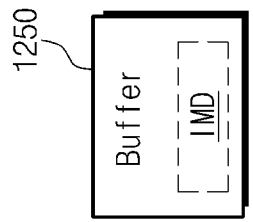

FIG. 10 is a conceptual diagram showing a method to manage operations of nonvolatile memories in each of a first operation mode and a second operation mode of FIG. 2A. Reference is now made to FIGS. 1 and 10.

Referring to FIG. 10, an example that demonstrates a manner to store internal management data IMD that is irrelevant to a host 1100 (hereinafter referred to as a "type C manner") is described below with reference to FIG. 10. In FIG. 10, a square-shaped box represents a memory region included in the nonvolatile memories 1210. For example, the box may represent a page unit or a block unit of the nonvolatile memories 1210, but the present disclosure is not limited thereto.

In the second operation mode performed when a data amount corresponding to a specific power supply interval is large (i.e., when occurrences of the power PWR being powered followed by an interruption of the supplied power are rarely repeated), the nonvolatile memories 1210 may store the internal management data IMD. In other words, in the second operation mode, the memory controller 1230 may store the internal management data IMD in the nonvolatile memories 1210. For example, the internal management data IMD may include data that is irrelevant to the host 1100, such as data used to manage the performance of the storage device 1200, data used in an intermediate operation of the memory controller 1230, or the like.

However, storing the internal management data IMD may cause an increase in the number of P/E cycles on the nonvolatile memories 1210. As a result, the life span of the nonvolatile memories 1210 may be shortened faster. In particular, as described with reference to FIGS. 6 and 7, when occurrences of the power PWR being supplied followed by an interruption of the supplied power are frequently repeated, the life span of the nonvolatile memories 1210 may be shortened much faster.

For this reason, when occurrences of the power PWR being supplied followed by an interruption of the supplied power are frequently repeated, the nonvolatile memories 1210 may be differently managed. Accordingly, in the first operation mode performed when a data amount corresponding to a specific power supply interval is small (i.e., when occurrences of the power PWR being supplied followed by an interruption of the supplied power are frequently repeated), the nonvolatile memories 1210 may not store the internal management data IMD. In other words, in the first operation mode, the memory controller 1230 does not store the internal management data IMD in the nonvolatile memories 1210. Accordingly, the severity of shortening of the life span of the nonvolatile memories 1210 may be reduced.

Instead, the internal management data IMD may be stored (e.g., buffered) in the buffer memory 1250 included in the storage device 1200. The memory controller 1230 may operate based on the internal management data IMD buffered in the buffer memory 1250.

Referring to FIGS. 6 to 10, the type A manner, the type B manner, and the type C manner for managing operations of the nonvolatile memories 1210 in each of the first operation mode and the second operation mode have been described. At least one of the type A manner, the type B manner, or the type C manner may be employed in each of the first operation mode and the second operation mode. In some example embodiments, one or more of the type A manner, the type B manner, and the type C manner may not be employed. In addition, other manners different from the type A manner, the type B manner, and the type C manner may be further employed for the first operation mode and the second operation mode. The example embodiments may be changed or modified in various ways to control operations of the nonvolatile memories 1210 differently based on a data amount.

Figure 11:
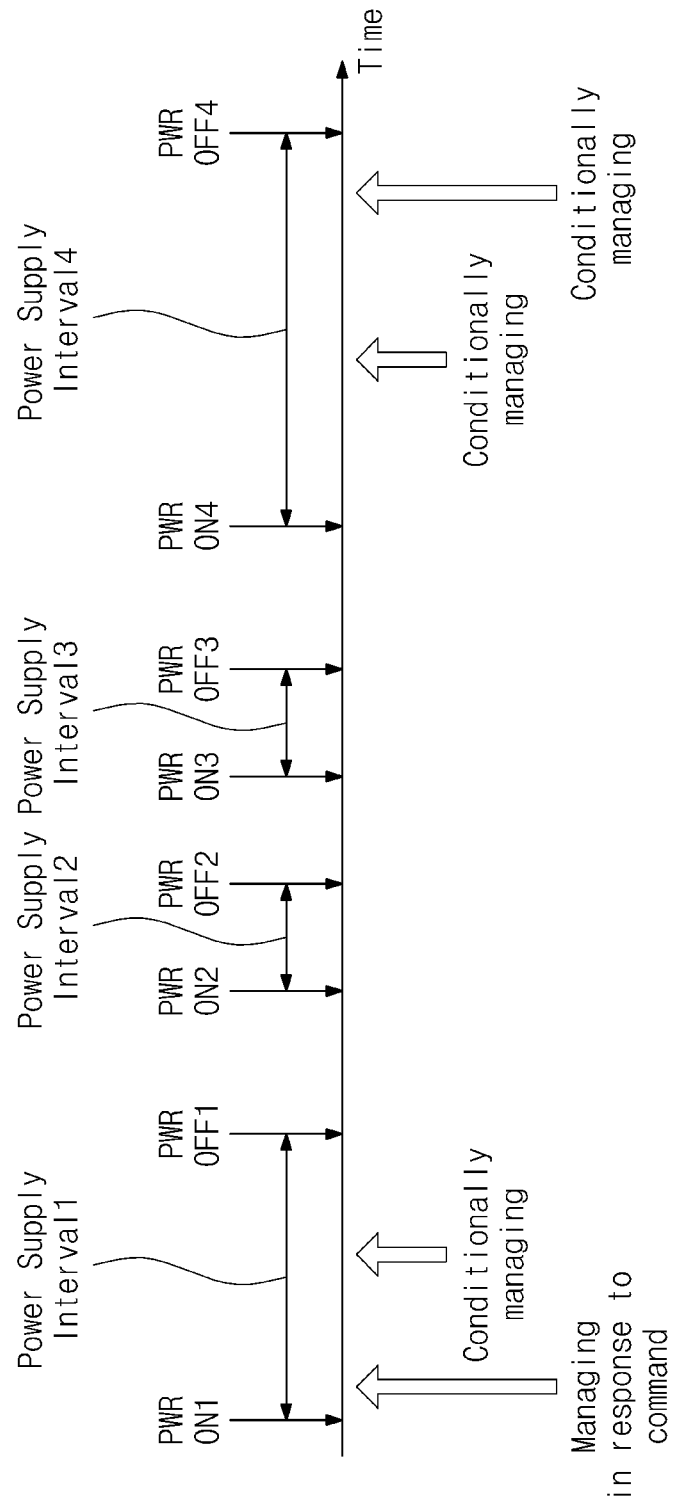
FIG. 11 is a conceptual diagram showing an operation to obtain a data amount associated with the technique of FIG. 2A.

FIG. 11 is a conceptual diagram showing an operation to obtain a data amount associated with the technique of FIG. 2A. Reference is now made to FIGS. 1 and 11.

Similar to the examples of FIGS. 3 and 5, FIG. 11 shows four events where power PWR is supplied (i.e., the power PWR begins to be supplied) and four events where the power PWR supplied to the storage device 1200 is interrupted. There may be four power supply intervals including occurrences of the power PWR being supplied followed by an interruption of the supplied power, which are repeated one after the other.

In some example embodiments, the procedure of FIG. 2A may be performed while the storage device 1200 is operating. The procedure of FIG. 2A may be performed when a management condition is satisfied after the storage device 1200 is booted. For example, the procedure of FIG. 2A may be performed for each and every specific time period. In response to a lapse of the specific time period, a data amount may be obtained and an operation mode of one or more nonvolatile memories 1210 may be selected.

By way of another example, the procedure of FIG. 2A may be performed when a specific data amount occurs. When the data amount of write data and/or read data exceeds a specific value, the memory controller 1230 may obtain the data amount and may select an operation mode of the nonvolatile memories 1210. However, the above examples are provided to assist in the understanding of the present disclosure, and the present disclosure is not limited thereto.

In some example embodiments, the procedure of FIG. 2A may be performed in response to a command provided from a host 1100. When the command is provided from the host 1100 while the storage device 1200 is operating, the memory controller 1230 may obtain the data amount and may select an operation mode of the nonvolatile memories 1210. Consequently, a communication protocol corresponding to transmission of a command for triggering the procedure of FIG. 2A may be additionally defined.

Obtaining the data amount has been described with reference to FIGS. 2A to 5, and operation modes of the nonvolatile memories 1210 have been described with reference to FIGS. 6 to 10. For the sake of brevity, redundant descriptions are omitted.

Figure 12:
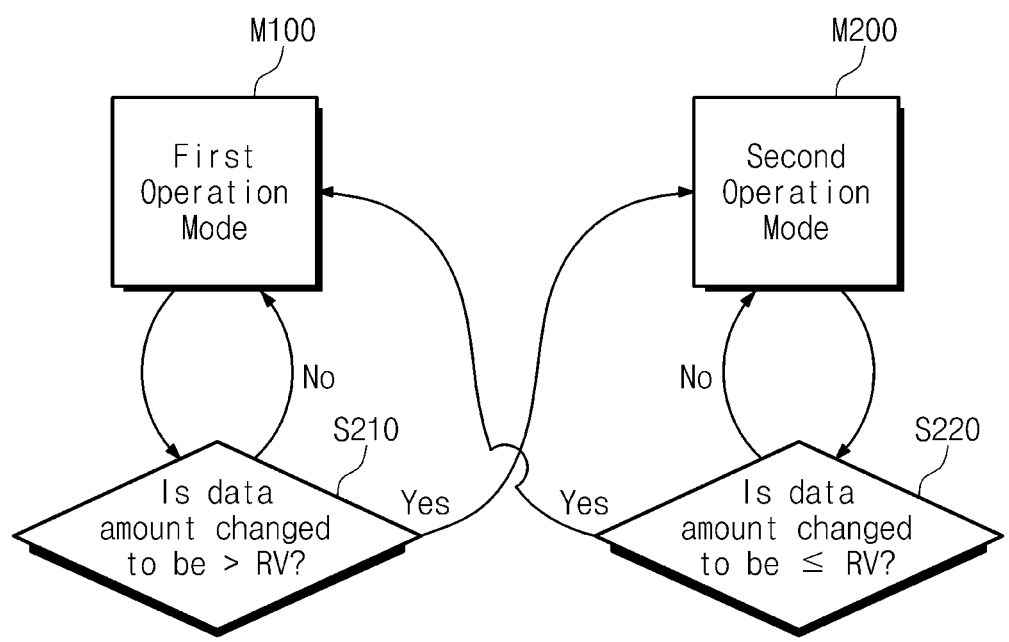
FIG. 12 is a state diagram showing transitions between operation modes according to an example embodiment.

FIG. 12 is a state diagram showing transitions between operation modes according to an example embodiment. Reference is now made to FIGS. 1 and 12. In some example embodiments, after an operation mode of one or more nonvolatile memories 1210 is selected, the selected operation modes may be changed or altered.

For example, it will be assumed that the nonvolatile memories 1210 operate in the first operation mode M100. During the first operation mode M100, in operation S210, it may be determined whether a data amount is changed to be greater than a reference value RV. For example, when a management condition is satisfied or a command is provided from a host 1100 during the first operation mode M100, the memory controller 1230 may obtain or update a data amount. Obtaining or updating the data amount has been described above with reference to FIGS. 3 and 5, and redundant descriptions are omitted. The memory controller 1230 may compare the obtained or updated data amount with the reference value RV.

When the data amount is still less than or equal to the reference value RV, the memory controller 1230 may continuously control the nonvolatile memories 1210 in the first operation mode M100. Conversely, when the data amount is changed to be greater than the reference value RV, the memory controller 1230 may control the nonvolatile memories 1210 such that the nonvolatile memories 1210 operate in the second operation mode M200.

During the second operation mode M200, in operation S220, it may be determined whether a data amount is changed to be less than or equal to the reference value RV. For example, when a management condition is satisfied or a command is provided from the host 1100 during the second operation mode M200, the memory controller 1230 may obtain or update a data amount. In addition, the memory controller 1230 may compare the obtained or updated data amount with the reference value RV.

When the data amount is still greater than the reference value RV, the memory controller 1230 may continuously control the nonvolatile memories 1210 in the second operation mode M200. Conversely, when the data amount is changed to be less than or equal to the reference value RV, the memory controller 1230 may control the nonvolatile memories 1210 such that the nonvolatile memories 1210 operate in the first operation mode M100.

In some example embodiments, the memory controller 1230 may update information associated with the data amount while the nonvolatile memories 1210 are operating. In addition, the memory controller 1230 may change the manner(s) to control the nonvolatile memories 1210 based on the updated information. Accordingly, the operation mode of the nonvolatile memories 1210 may be changed or altered. According to such an example embodiment, operations of the nonvolatile memories 1210 may be efficiently managed according to an operation condition.

Figure 13:
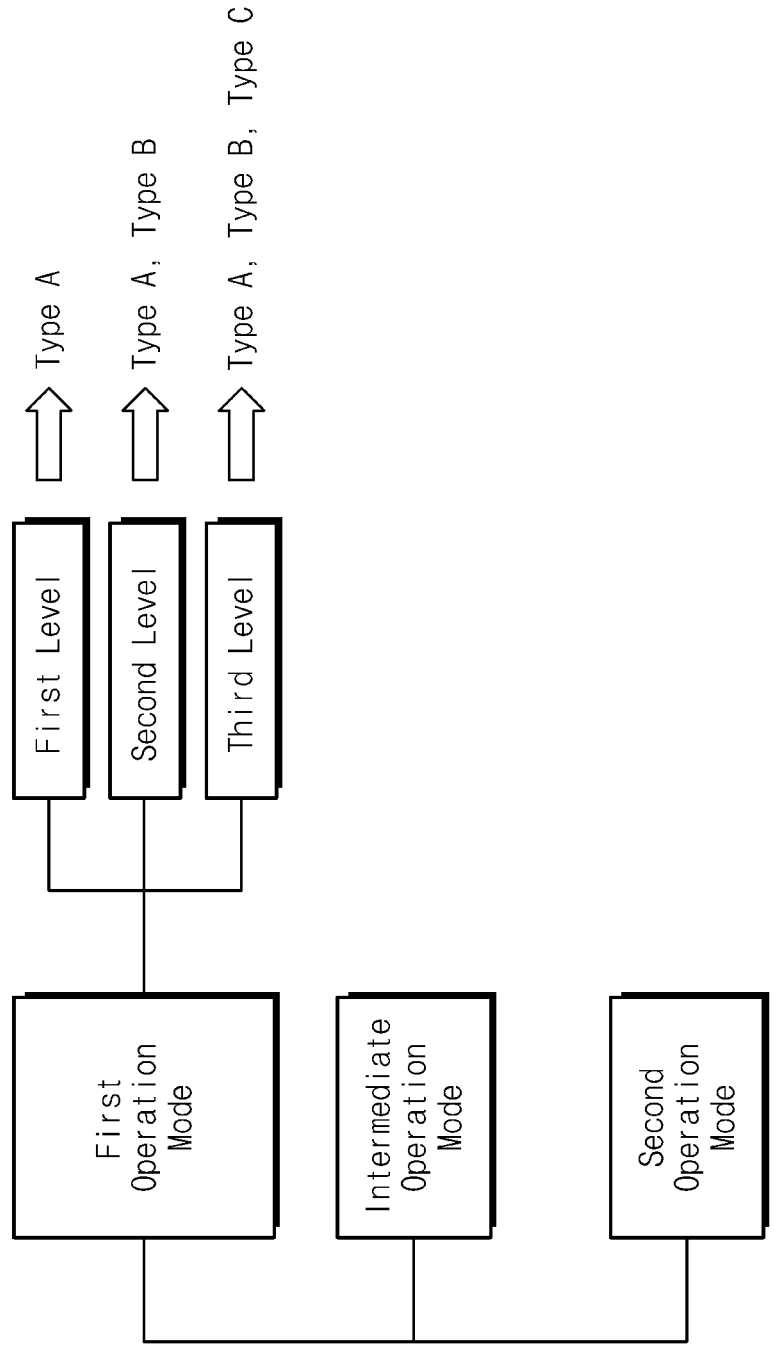
FIG. 13 is a conceptual diagram showing an example of operation modes according to an example embodiment.

FIG. 13 is a conceptual diagram showing example operation modes according to an example embodiment. Reference is now made to FIGS. 1 and 13.

In some example embodiments described with reference to FIGS. 2A to 12, it has been described that one or more nonvolatile memories 1210 operate in one operation mode among two operation modes. However, in some example embodiments, an operation mode of the nonvolatile memories 1210 may be one of three or more operation modes. Operations on the nonvolatile memories 1210 may be performed differently in each of three or more operation modes.

For example, referring to FIG. 13, the nonvolatile memories 1210 may operate in one of a first operation mode, a second operation mode, or an intermediate operation mode. In this example, the intermediate operation mode may be an operation mode to operate the nonvolatile memories 1210 differently from the first and second operation modes. Alternatively, the intermediate operation mode may be an operation mode to operate the nonvolatile memories 1210 at the intermediate condition between the first and second operation modes. In some example embodiments, the nonvolatile memories 1210 may further operate in another operation mode other than the first operation mode, the second operation mode, and the intermediate operation mode.

In some example embodiments, at least one operation mode among the operation modes of the nonvolatile memories 1210 may be divided into a plurality of levels. In addition, operations on the nonvolatile memories 1210 may be performed differently according to the levels of the operation mode. For example, the first operation mode may be divided into a first level, a second level, and a third level. In this example, operations on the nonvolatile memories 1210 may be performed differently in each of the first to third levels of the first operation mode.

For example, in the first level of the first operation mode, the memory controller 1230 may control the nonvolatile memories 1210 employing only the type A manner described with reference to FIG. 8. Meanwhile, in the second level of the first operation mode, the memory controller 1230 may control the nonvolatile memories 1210 employing the type B manner described with reference to FIG. 9, as well as the type A manner. In addition, in the third level of the first operation mode, the memory controller 1230 may control the nonvolatile memories 1210 employing the type C manner described with reference to FIG. 10, as well as the type A manner and the type B manner. In some other examples, the manner(s) employed for each of the first to third levels may be changed or modified.

FIG. 13 is provided to assist in the understanding of the present disclosure, and the present disclosure is not limited to FIG. 13. In some example embodiments, other operation modes other than the first operation mode may be divided into a plurality of levels. Alternatively, the first operation mode need not be divided into a plurality of levels. In addition, one operation mode may be divided into two levels or four or more levels. The example embodiments may be modified or changed in various ways.

Figure 14:
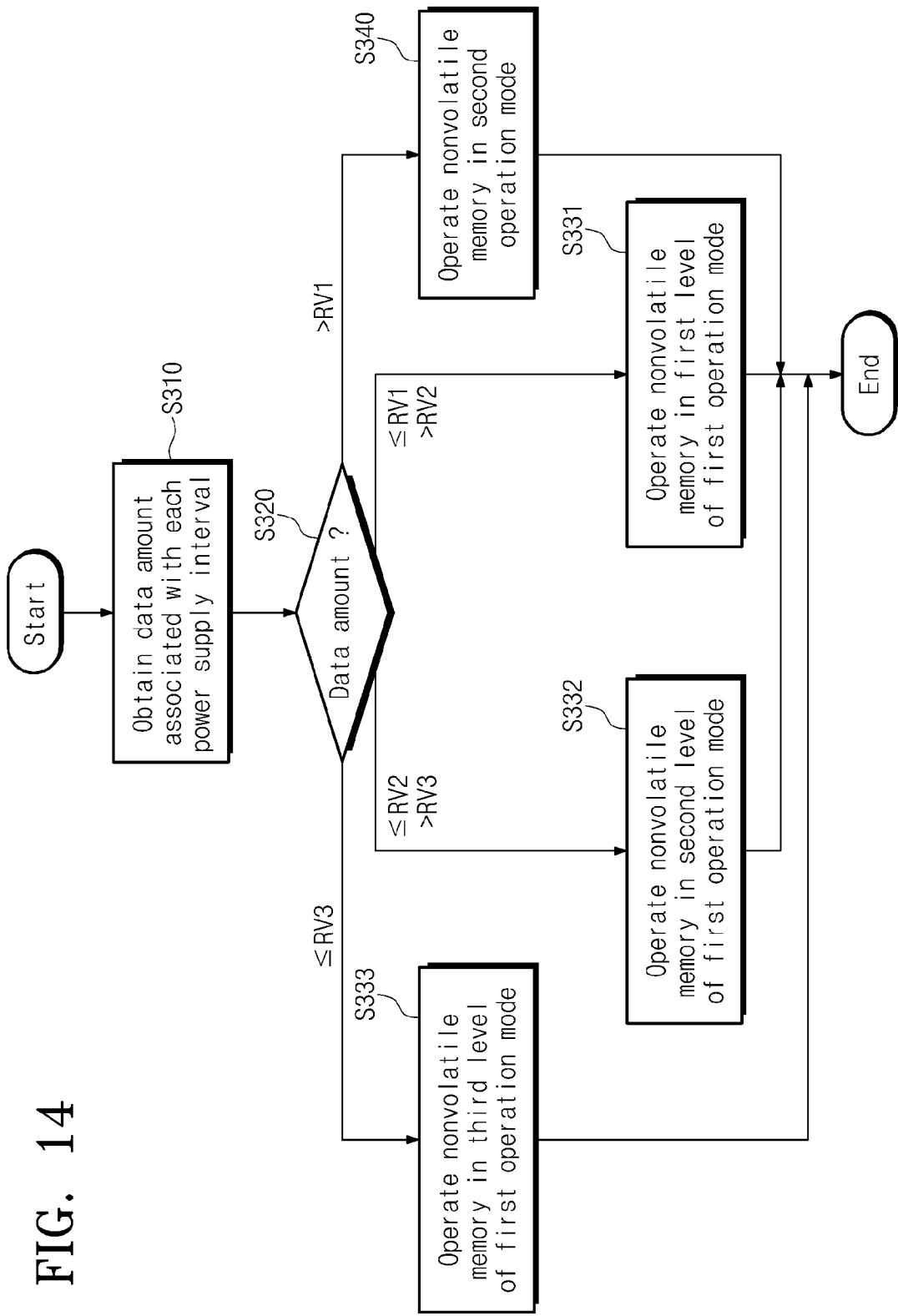
FIG. 14 is a flow chart illustrating a technique for managing operations of nonvolatile memories based on operation modes according to an example of FIG. 13.

FIG. 14 is a flow chart illustrating a technique for managing operations of nonvolatile memories based on operation modes according to an example embodiment of FIG. 13. The procedure described in FIG. 14 may be processed by the memory-related section of a memory controller 1230 of FIG. 1. Reference is now made to FIGS. 1 and 14.

In operation S310, the memory controller 1230 may obtain a data amount of write data stored in one or more nonvolatile memories 1210 and/or read data output from the nonvolatile memories 1210. The data amount may be calculated with respect to each power supply interval between a point in time where power PWR is supplied and a point in time where the supplied power PWR is interrupted. Obtaining or updating of the data amount has been described above with reference to FIGS. 2A, 3, 5, 11, and 12, and thus, redundant descriptions are omitted.

In operation S320, the memory controller 1230 may determine a level of the data amount obtained in operation S310. For example, the memory controller 1230 may determine whether the data amount is greater than a first reference value RV1, less than or equal to the first reference value RV and greater than a second reference value RV2, less than or equal to the second reference value RV2 and greater than a third reference value RV3, or less than or equal to the third reference value RV3.

For example, the first reference value RV1, the second reference value RV2, and the third reference value RV3 may be selected considering a level of influence on life spans of the nonvolatile memories due to repetitions of supplying the power PWR followed by an interruption of the supplied power. Additionally or alternatively, the first reference value RV1, the second reference value RV2, and the third reference value RV3 may be selected considering life span of the storage device 1200 that may be guaranteed by the nonvolatile memories 1210. Such information associated with the life span of the nonvolatile memories 1210 may be obtained through various test operations that are performed while or after the storage device 1200 is manufactured.

The first reference value RV1, the second reference value RV2, and the third reference value RV3 may be stored in the nonvolatile memories 1210 or any other memory in advance while or after the storage device 1200 is manufactured. Alternatively, the first reference value RV1, the second reference value RV2, and the third reference value RV3 may be provided from the host 1100 while the storage device 1200 is operating, or may be calculated by the memory controller 1230. Each of the first reference value RV1, the second reference value RV2, and the third reference value RV3 may be a fixed value or a variable value. The first reference value RV1, the second reference value RV2, and the third reference value RV3 may be modified or changed in various ways according to implementation of the example embodiments.

When the data amount obtained in operation S310 is less than or equal to the first reference value RV1 and greater than the second reference value RV2, in operation S331, the memory controller 1230 may control the nonvolatile memories 1210 such that the nonvolatile memories 1210 operate in a first level of the first operation mode. When the data amount obtained in operation S310 is less than or equal to the second reference value RV2 and greater than the third reference value RV3, in operation S332, the memory controller 1230 may control the nonvolatile memories 1210 such that the nonvolatile memories 1210 operate in a second level of the first operation mode.

Further, when the data amount obtained in operation S310 is less than or equal to the third reference value RV3, in operation S333, the memory controller 1230 may control the nonvolatile memories 1210 such that the nonvolatile memories 1210 operate in a third level of the first operation mode. On the other hand, when the data amount obtained in operation S310 is greater than the first reference value RV1, in operation S340, the memory controller 1230 may control the nonvolatile memories 1210 such that the nonvolatile memories 1210 operate in the second operation mode. According to such an example embodiment, operations of the nonvolatile memories 1210 may be managed differently according to the data amount.

FIG. 15 is a table showing a technique for managing operations of nonvolatile memories based on an amount of free blocks in an example embodiment. Reference is now made to FIGS. 1 and 15.

In some example embodiments described with reference to FIGS. 2A to 14, one or more nonvolatile memories 1210 are managed based on a data amount corresponding to a power supply interval. However, in some example embodiments, an operation mode of the nonvolatile memories 1210 may be selected based on other criteria other than the data amount.

For example, the memory controller 1230 may control the nonvolatile memories 1210 based on an amount (e.g., a number or percentage) of free blocks that are included in the nonvolatile memories 1210. The memory controller 1230 may manage information associated with a free block or an allocated block included in the nonvolatile memories 1210, and may recognize the amount (e.g., the absolute number or the relative percentage) of free blocks based on the information.

As described with reference to FIG. 3, the lengths of power supply intervals may be different from one another. As described with reference to FIG. 4, when a length of a power supply interval is short, occurrences of the power PWR being supplied followed by an interruption of the supplied power may be frequently repeated. As described with reference to FIGS. 6 to 9, an amount of the garbage data may increase when occurrences of the power PWR being supplied followed by an interruption of the supplied power are frequently repeated. Thus, the amount of free blocks may decrease. Accordingly, when the amount of free blocks is determined to be small during a booting operation, it may be inferred that occurrences of the power PWR being supplied followed by an interruption of the supplied power are frequently repeated.

On the other hand, when a length of a power supply interval is long, occurrences of the power PWR being supplied followed by an interruption of the supplied power may be rare. In such a case, the amount of garbage data may be reduced, and the amount of free blocks may increase. As a result, when the amount of free blocks is determined to be large during the booting operation, it may be inferred that occurrences of the power PWR being supplied followed by an interruption of the supplied power are rarely repeated.

Accordingly, in some example embodiments, the memory controller 1230 may refer to the amount of free blocks to control operations of the nonvolatile memories 1210. In some other example embodiments, the memory controller 1230 may determine an operation mode of the nonvolatile memories 1210 with reference to both the data amount and the amount of free blocks. The example embodiments may be modified or changed in various ways.

According to the example embodiments, even though occurrences of the power PWR being supplied followed by an interruption of the supplied power are frequently repeated on the storage device 1200, operations of the nonvolatile memories 1210 may be managed considering the life span of the nonvolatile memories 1210 and the performance of the storage device 1200. Accordingly, the storage device 1200 of the example embodiment may provide the maximum reliability and/or optimal performance regardless of a tendency of power supply interruptions to occur.

Example embodiments associated with internal operations of the storage device 1200 in accordance with the control of the memory controller 1230 have been described with reference to FIGS. 2A to 15. Since the internal operations of the storage device 1200 may be changed depending on an operation mode of the nonvolatile memories 1210, in some example embodiments, the host 1100 may recognize or manage an operation of the storage device 1200. Some example embodiments associated with the host 1100 are described below with reference to FIGS. 16 to 19.

Figure 16:
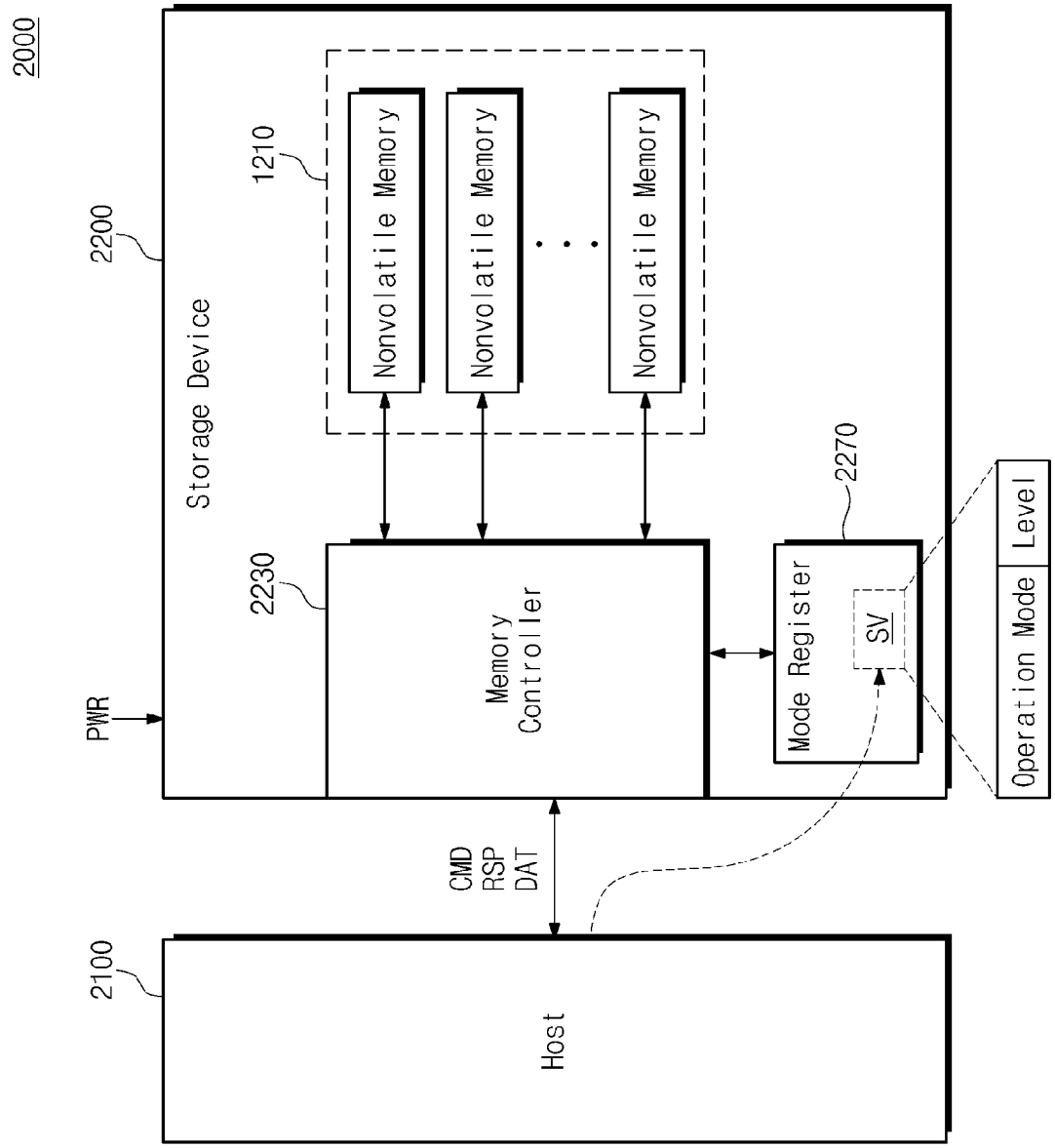
FIG. 16 is a block diagram illustrating a storage system including a storage device according to an example embodiment.

FIG. 16 is a block diagram illustrating a storage system 2000 including a storage device 2200 according to an example embodiment. The storage system 2000 may include a host 2100 and the storage device 2200.

In some example embodiments, the storage device 2200 may include one or more nonvolatile memories 1210, a memory controller 2230, and a mode register 2270. Configurations and operations of the nonvolatile memories 1210 are described above with reference to FIG. 1. Configurations and operations of the host 2100, the storage device 2200, and the memory controller 2230 may include configurations and operations of the host 1100, the storage device 1200, and the memory controller 1230 of FIG. 1, respectively. For the sake of brevity, redundant descriptions associated with the host 2100, the storage device 2200, the nonvolatile memories 1210, and the memory controller 2230 are not repeated.

The mode register 2270 may store a status value SV. The status value SV may include information associated with an operation mode of the nonvolatile memories 1210. For example, the status value SV may indicate an operation mode of the nonvolatile memories 1210 (e.g., a first operation mode or a second operation mode, as described with reference to FIG. 2A). For example, when the nonvolatile memories 1210 operate in an operation mode that is divided into a plurality of levels, the status value SV may further indicate a level of an operation mode.

The memory controller 2230 may determine an operation mode (and, in some cases, a level) of the nonvolatile memories 1210 based on a data amount. In addition, the memory controller 2230 may set the status value SV of the mode register SV based on the determined result.

In some example embodiments, the status value SV stored in the mode register 2270 may be directly or indirectly accessed by the host 2100. The host 2100 may recognize or manage an operation of the status value 2200 with reference to the status value SV. The mode register 2270 may be included in the host-related section that is provided to monitor and control an operation of the storage device 2200 by the host 2100.

The host 2100 may obtain information associated with the operation mode of the storage device 2200 by providing a command to the storage device 2200. In some cases, as the storage device 2200 operates in a specific operation mode, the operation performance required by the host 2100 may not be demonstrated. Accordingly, in some example embodiments, the host 2100 may directly control changing or switching an operation of the storage device 2200. Such example embodiments associated with the host 2100 are described below with reference to FIGS. 17 to 19.

Figure 17:
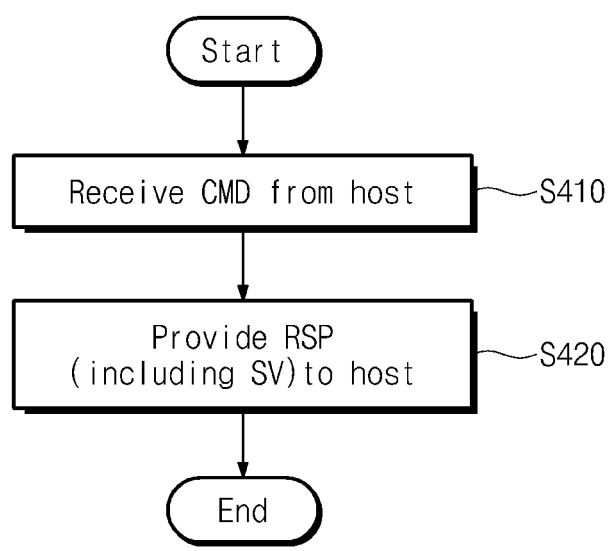
FIG. 17 is a flow chart illustrating a technique for providing a host with information associated with an operation mode according to an example embodiment.

FIG. 17 is a flow chart illustrating a technique for providing a host with information associated with an operation mode according to an example embodiment. The procedure described in FIG. 17 may be processed between a host 2100 and a host-related section of a memory controller 2230 of FIG. 16. Reference is now made to FIGS. 16 and 17.

In operation S410, the memory controller 2230 may receive a command CMD from the host 2100. The host 2100 may provide the command CMD to the memory controller 2230 to request information associated with an operation mode of the storage device 2200.

In operation S420, the memory controller 2230 may provide a response RSP to the host 2100. The response RSP may include information associated with an operation manner of the nonvolatile memories 1210. For example, the memory controller 2230 may provide the host 2100 with information that is stored in an internal cache memory or a buffer memory as the response RSP. Alternatively, the memory controller 2230 may read a status value SV stored in a mode register 2270, and may provide the read status value SV to the host 2100. Accordingly, the memory controller 2230 may provide the host 2100 with information associated with a manner of controlling the nonvolatile memories 1210 in response to a request (e.g., the command CMD) from the host 2100.

The host 2100 may obtain information associated with the operation of the storage device 2200 by accessing the mode register 2270 to obtain the status value SV or by providing the command CMD to the memory controller 2230 to receive the response RSP. Thus, the host 2100 may recognize the operation mode of the storage device 2200, and may manage the operation of the storage device 2200. A communication protocol for implementing the procedure of FIG. 17 may be further defined and used between the host 2100 and the storage device 2200.

Figure 18:
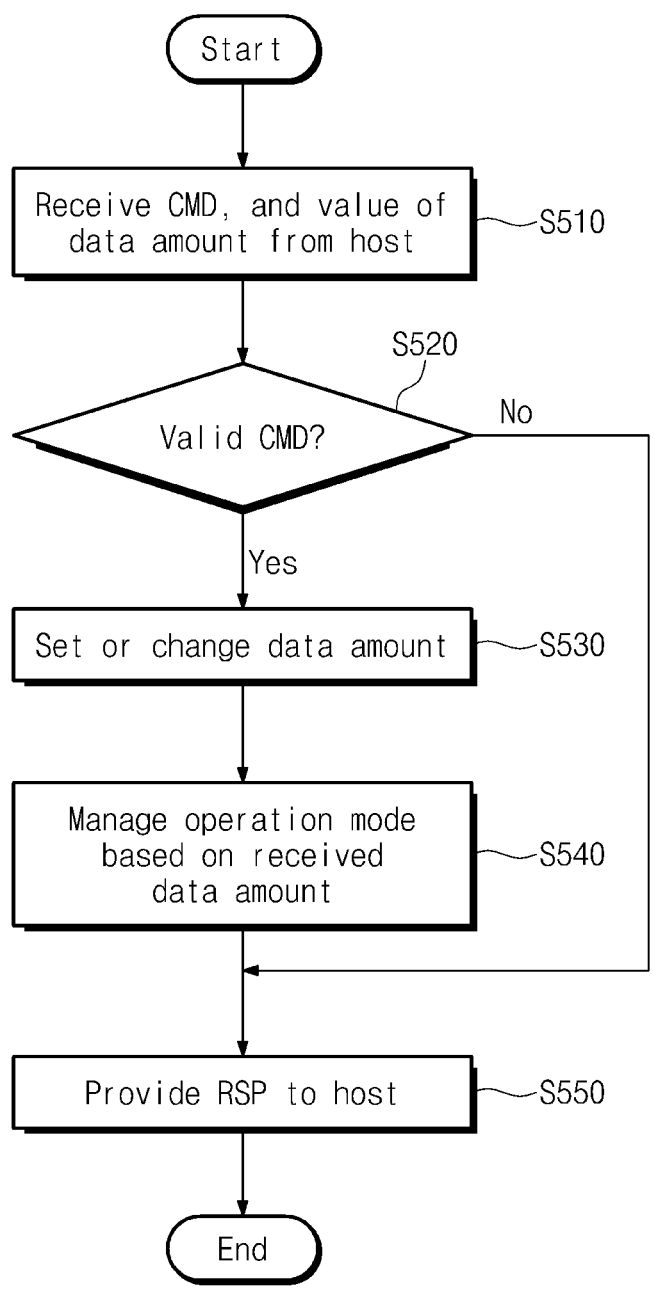
FIG. 18 is a flow chart illustrating a technique for managing operations of nonvolatile memories based on a value of a data amount provided from a host, according to an example embodiment.

FIG. 18 is a flow chart illustrating a technique for managing operations of nonvolatile memories based on a value of a data amount provided from a host, according to an example embodiment. The procedure described in FIG. 18 may be processed between a host 2100 and a host-related section of a memory controller 2230 of FIG. 16. Reference is now made to FIGS. 16 and 18.

In operation S510, the memory controller 2230 may receive a command CMD from the host 2100. In addition, the memory controller 2230 may receive a value of a data amount from the host 2100. In some example embodiments, the host 2100 may manage the data amount by itself in a manner that is identical or similar to that described with reference to FIGS. 3, 5, and/or 11. The host 2100 may provide the command CMD to the memory controller 2230 to directly set or change a data amount that is relied on to select an operation mode of one or more nonvolatile memories 1210.

In operation S520, the memory controller 2230 may determine whether the command CMD received in operation S510 is valid. When the command CMD is valid, in operation S530, the value of the data amount may be set or changed to the value received in operation S510 under the control of the memory controller 2230.

In some cases, the storage device 2200 may not have a value of the data amount. In this case, the host 2100 may provide an initial value of the data amount to the data storage 2200. Alternatively, when the host 2100 directly manages a data amount of data provided to the storage device 2200 and/or data received from the storage device, the host 2100 may provide the storage device 2200 with the value of the data amount. The memory controller 2230 may set the data amount to the received value.

In some cases, the data amount managed by the memory controller 2230 may not be suitable to control the nonvolatile memories 1210. In this case, the host 2100 may provide an appropriate value of the data amount to the storage device 2200. The memory controller 2230 may change the data amount to the received value. Alternatively, the host 2100 may initialize the value of the data amount that is managed by the memory controller 2230.

In operation S540, the memory controller 2230 may control an operation mode of the nonvolatile memories 1210 differently based on the received data amount. Selecting and managing the operation mode of the nonvolatile memories 1210 are described above with reference to FIGS. 2A to 10, and thus, redundant descriptions are omitted.

In operation S550, the memory controller 2230 may provide a response RSP to the host 2100. In some cases, the response RSP may indicate that setting or changing the data amount is completed. In some cases, the response RSP may indicate that an error occurs in setting or changing the data amount. In some cases, when the command CMD is determined to be invalid in operation S520, the response RSP may indicate that the command CMD is not processed.

During the procedure of FIG. 18, the host 2100 may directly set or change the value of the data amount to manage the operation of the storage device 2200. A communication protocol for implementing the procedure of FIG. 18 may be further defined and used between the host 2100 and the storage device 2200.

Figure 19:
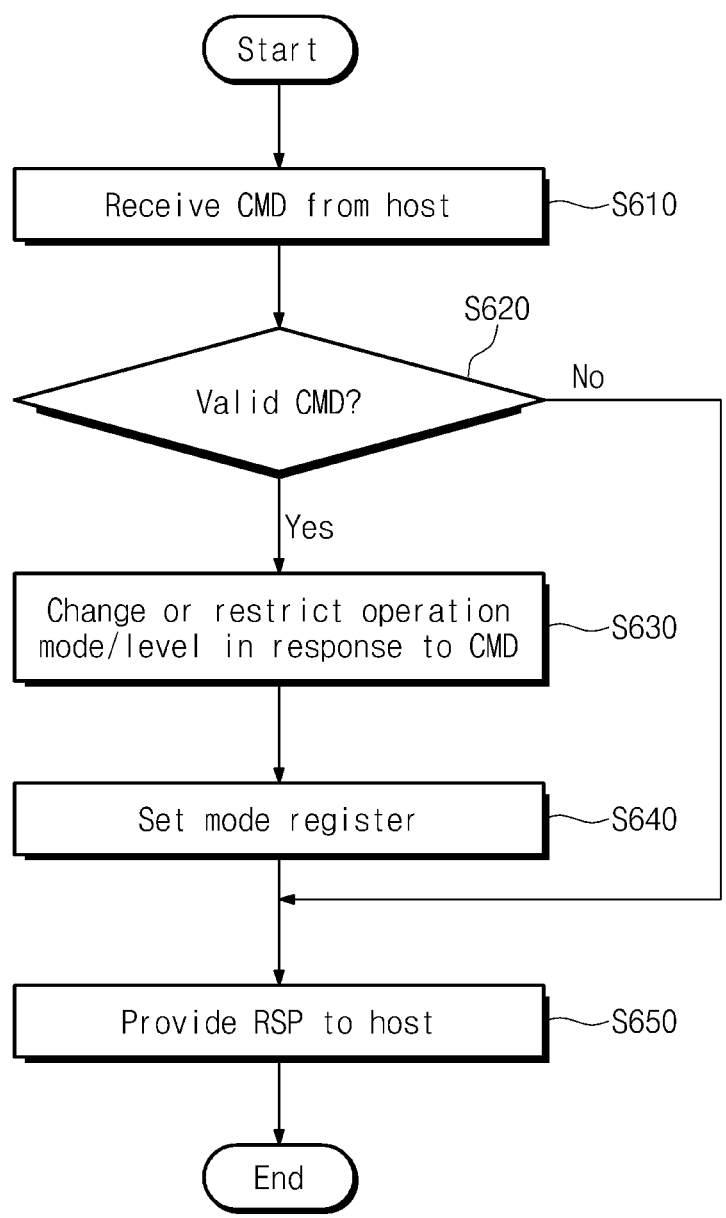
FIG. 19 is a flow chart illustrating a technique for managing an operation mode and/or a level in response to a command provided from a host, according to an example embodiment.

FIG. 19 is a flow chart illustrating a technique for managing an operation mode and/or a level in response to a command provided from a host, according to an example embodiment. The procedure described in FIG. 19 may be processed between a host 2100 and a host-related section of a memory controller 2230 of FIG. 16. Reference is now made to FIGS. 16 and 19.

In operation S610, the memory controller 2230 may receive a command CMD from the host 2100. The host 2100 may provide the command CMD to the memory controller 2230 to manage an operation mode and/or an operation level of one or more nonvolatile memories 1210.

In operation S620, the memory controller 2230 may determine whether the command CMD received in operation S610 is valid. When the command CMD is valid, in operation S630, the operation mode and/or the operation level of the nonvolatile memories 1210 may be controlled under the control of the memory controller 2230.

For example, in response to the command CMD, the memory controller 2230 may change or restrict the operation mode of the nonvolatile memories 1210. For example, when the storage device 1210 operates in a first operation mode for a long time, the operation performance required by the host 2100 may not be demonstrated. In this case, the host 2100 may issue the command CMD to change the operation mode of the nonvolatile memories 1210 to a second operation mode. In some cases, the host 2100 may issue the command CMD to restrict the operation of the nonvolatile memories 1210 such that the operation mode of the nonvolatile memories 1210 is not changed.

For example, in response to the command CMD, the memory controller 2230 may change or restrict the level of the operation mode of the nonvolatile memories 1210. For example, when the storage device 1210 operates in a third level of the first operation mode for a long time, the operation performance required by the host 2100 may not be demonstrated. In this case, the host 2100 may issue the command CMD to operate the nonvolatile memories 1210 in a first level of the first operation mode. In some cases, the host 2100 may issue the command CMD to restrict the operation of the nonvolatile memories 1210 such that the level of the operation mode of the nonvolatile memories 1210 is not changed.

In operation S640, the mode register 2270 may be newly set. For example, a status value SV stored in the mode register 2270 may be changed based on the operation mode and/or the operation level that is changed or restricted in operation S630. For example, the mode register 2270 may be managed under the control of the memory controller 2230. Alternatively, the mode register 2270 may be directly managed by the host 2100.

In operation S650, the memory controller 2230 may provide a response RSP to the host 2100. In some cases, the response RSP may indicate that changing or restricting the operation mode and/or the operation level is completed. In some cases, the response RSP may indicate that an error has occurred in changing or restricting the operation mode and/or the operation level. In some cases, when the command CMD is determined to be invalid in operation S620, the response RSP may indicate that the command CMD is not processed.

In the procedure of FIG. 19, the host 2100 may communicate with the memory controller 2230 to manage the operation mode and/or the operation level of the nonvolatile memories 1210. A communication protocol for implementing the procedure of FIG. 19 may be further defined and used between the host 2100 and the storage device 2200.

Figure 20:
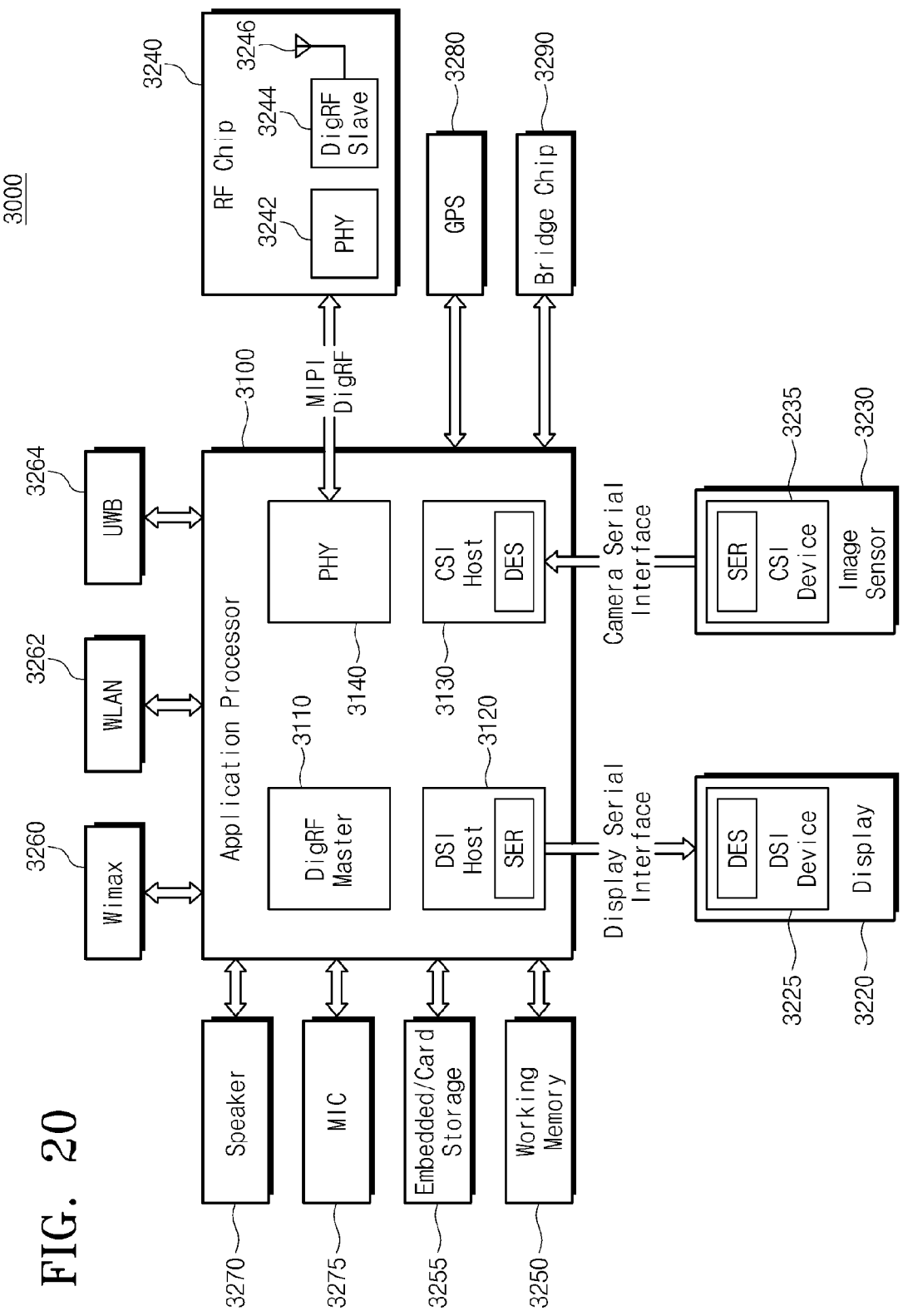
FIG. 20 is a block diagram illustrating an electronic system including a storage device according to an example embodiment and interfaces thereof.

FIG. 20 is a block diagram illustrating an electronic system including a storage device according to an example embodiment and interfaces thereof. An electronic system 3000 may be implemented with a data processing device capable of using or supporting an interface proposed by the mobile industry processor interface (MIPI) alliance. For example, the electronic system 3000 may be one of various electronic devices, such as a portable communication terminal, a personal digital assistant (PDA), a portable multimedia player (PMP), a smart phone, a wearable device, or the like.

The electronic system 3000 may include an application processor 3100, a display 3220, and an image sensor 3230. The application processor 3100 may include a DigRF master 3110, a display serial interface (DSI) host 3120, a camera serial interface (CSI) host 3130, and a physical layer (PHY) 3140.

The DSI host 3120 may communicate with a DSI device 3225 of the display 3220 in compliance with DSI. For example, an optical serializer SER may be implemented in the DSI host 3120. For example, an optical deserializer DES may be implemented in the DSI device 3225.

The CSI host 3130 may communicate with a CSI device 3235 of the image sensor 3230 in compliance with CSI. For example, an optical deserializer DES may be implemented in the CSI host 3130. For example, an optical serializer SER may be implemented in the CSI device 3235.

The electronic system 3000 may further include a radio frequency (RF) chip 3240 for communicating with the application processor 3100. The RF chip 3240 may include a physical layer (PHY) 3242, a DigRF slave 3244, and an antenna 3246. For example, the PHY 3242 of the RF chip 3240 and the PHY 3140 of the application processor 3100 may exchange data with each other in compliance with DigRF interface proposed by the MIPI alliance.

The electronic system 3000 may further include a working memory 3250 and an embedded/card storage 3255. The working memory 3250 and the embedded/card storage 3255 may store data received from the application processor 3100. Moreover, the working memory 3250 and the embedded/card storage 3255 may provide the data stored therein to the application processor 3100.

The working memory 3250 may temporarily store data processed or to be processed by the application processor 3100. The working memory 3250 may include a volatile memory such as SRAM, DRAM, SDRAM, or the like, and/or a nonvolatile memory such as a flash memory, PRAM, MRAM, ReRAM, FRAM, or the like.

The embedded/card storage 3255 may store data regardless of power supply. The embedded/card storage 3255 may include one or more nonvolatile memories and a memory controller. For example, the embedded/card storage 3255 may include one or more nonvolatile memories such as a flash memory, PRAM, MRAM, ReRAM, FRAM, or the like. For example, the embedded/card storage 3255 may include one or more devices such as a secure digital (SD) card, an embedded multimedia card (eMMC), an UFS card, or the like.

The embedded/card storage 3255 may be implemented based on at least one of the example embodiments of the present disclosure. The embedded/card storage 3255 may manage an operation of a nonvolatile memory differently based on a data amount of write data stored in the nonvolatile memory and/or read data output from the nonvolatile memory. The example embodiments have been described with reference to FIGS. 1 to 19, and redundant descriptions are omitted.

According to the example embodiments, even though occurrences of the power being supplied followed by an interruption of the supplied power are frequently repeated in the embedded/card storage 3255, the operations of the nonvolatile memory may be managed considering the life span of the nonvolatile memory and the performance of the embedded/card storage 3255. Accordingly, the embedded/card storage 3255 may provide high reliability and/or optimal performance regardless of a tendency of power supply interruptions to occur.

The electronic system 3000 may communicate with an external system through a communication module, such as one or more of a worldwide interoperability for microwave access (WiMax) 3260, a wireless local area network (WLAN) 3262, and an ultra-wideband (UWB) 3264, or the like. The electronic system 3000 may further include at least one of a speaker 3270 or a microphone 3275 for processing voice information. The electronic system 3000 may further include a global positioning system (GPS) device 3280 for processing position information. The electronic system 3000 may further include a bridge chip 3290 for managing connections with a peripheral device(s).

Figure 21:
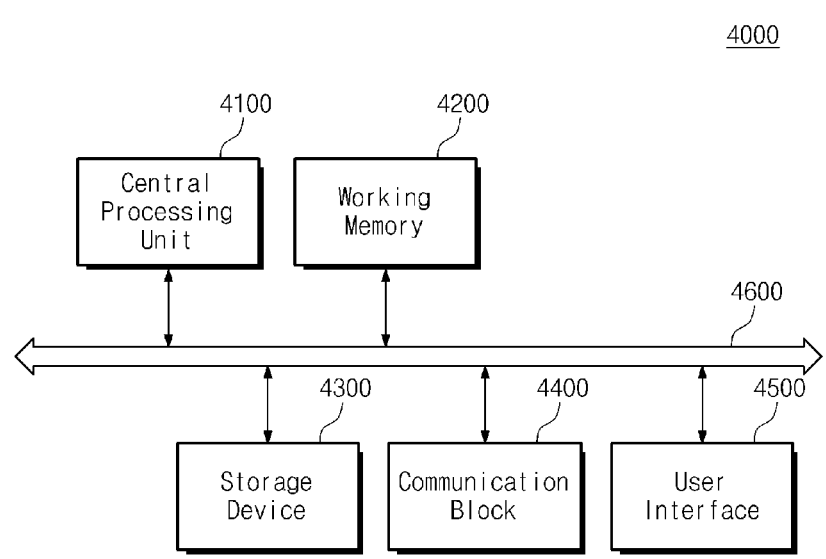
FIG. 21 is a block diagram illustrating a computing device including a storage device according to an example embodiment.

FIG. 21 is a block diagram illustrating a computing device including a storage device according to an example embodiment. A computing device 4000 may include a central processing unit 4100, a working memory 4200, a storage device 4300, a communication block 4400, a user interface 4500, and a bus 4600. For example, the computing device 4000 may be one of various electronic devices, such as a personal computer, a workstation, a notebook computer, a tablet, or the like.

The central processing unit 4100 may control the overall operations of the computing device 4000. The central processing unit 4100 may perform various kinds of arithmetic operations and/or logical operations. For example, the central processing unit 4100 may include one or more of a general-purposed processor, a special-purposed processor, an application processor, a microprocessor, or the like.

The working memory 4200 may exchange data with the central processing unit 4100. The working memory 4200 may store data used in an operation of the computing device 4000. The working memory 4200 may be used as a buffer or a cache of the computing device 4000. For example, the working memory 4200 may include a volatile memory system, such as one or more of an SRAM, a DRAM, an SDRAM, or the like. The working memory 4200 may include one or more memory modules or one or more memory packages.

The storage device 4300 may store data regardless of whether power is supplied. The storage device 4300 may include one or more nonvolatile memories and a memory controller. For example, the storage device 4300 may include one or more nonvolatile memories, such as a flash memory, PRAM, MRAM, ReRAM, FRAM, or the like. For example, the storage device 4300 may include a storage medium such as a solid state drive (SSD).

The storage device 4300 may be implemented based on at least one of the example embodiments of the present disclosure. The storage device 4300 may manage an operation of a nonvolatile memory differently based on a data amount of write data stored in the nonvolatile memory and/or read data output from the nonvolatile memory. The example embodiments have been described with reference to FIGS. 1 to 19, and redundant descriptions are omitted.

According to the example embodiments, even though occurrences of the power being supplied followed by an interruption of the supplied power are frequently repeated in the storage device 4300, the operation of the nonvolatile memory may be managed considering the life span of the nonvolatile memory and the performance of the storage device 4300. Accordingly, the storage device 4300 may provide high reliability and/or optimal performance regardless of a tendency of power supply interruptions to occur.

The communication block 4400 may communicate with an external device outside the computing device 4000 under the control of the central processing unit 4100. The communication block 4400 may communicate with an external device outside the computing device 4000 in compliance with a wired communication protocol and/or a wireless communication protocol. For example, the communication block 4400 may communicate with an external device outside the computing device 4000 in compliance with one or more various wireless communication protocols such as long term evolution (LTE), WiMax, global system for mobile communication (GSM), code division multiple access (CDMA), Bluetooth, near field communication (NFC), wireless fidelity (Wi-Fi), radio frequency identification (RFID), or the like, and/or one or more various wired communication protocols such as transfer control protocol/internet protocol (TCP/IP), USB, SCSI, ATA, PATA, SATA, SAS, IDE, Firewire, or the like.

The user interface 4500 may arbitrate communications between a user and the computing device 4000 under the control of the central processing unit 4100. For example, the user interface 4500 may include one or more input interfaces, such as a keyboard, a mouse, a keypad, a button, a touch panel, a touch screen, a touch pad, a touch ball, a camera, a microphone, a gyroscope sensor, a vibration sensor, or the like. Furthermore, the user interface 4500 may include one or more output interfaces, such as a liquid crystal display (LCD) device, a light emitting diode (LED) display device, an organic LED (OLED) display device, an active matrix OLED (AMOLED) display device, a speaker, a motor, or the like.

The bus 4600 may provide communication routes between components of the computing device 4000. The components of the computing device 4000 may exchange data with one another in compliance with a bus format of the bus 4600. For example, the bus format may include one or more of various protocols such as USB, SCSI, PCIe, NVMe, ATA, PATA, SATA, SAS, IDE, UFS, or the like.

Circuits, chips, and devices according to the example embodiments of the present disclosure may be mounted using various kinds of semiconductor packages. For example, circuits, chips, and devices according to the example embodiments may be mounted using a package, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), metric quad flat pack (MQFP), small outline integrated circuit (SOIC), shrink small outline package (SSOP), thin small outline package (TSOP), thin quad flat pack (TQFP), system in package (SIP), multi-chip package (MCP), wafer-level fabricated package (WFP), and/or wafer-level processed stack package (WSP).

According to the example embodiments, even though supplying the power and power supply interruption are frequently repeated in a storage device, the operations of nonvolatile memories may be managed considering the life span of the nonvolatile memories and the performance of the storage device. Accordingly, the storage device according to the example embodiments may provide high reliability and/or the optimal performance regardless of a tendency of power supply interruptions to occur.

The configuration shown in each of conceptual diagrams is to be understood just from the conceptual point of view. To assist in the understanding of the present disclosure, forms, structures, and sizes of each component shown in each conceptual diagram have been exaggerated or reduced. A configuration actually implemented may have a different physical shape from that shown in each conceptual diagram. Each conceptual diagram is not intended to limit the physical shape of the components.

A device configuration shown in each block diagram is provided to assist in the understanding of the present disclosure. Each block may be formed of smaller blocks according to functions. Alternatively, a plurality of blocks may form a larger block according to a function. That is, the spirit or the scope of the present disclosure is not limited to the configuration shown in a block diagram.

Above, the present disclosure has been described based on some example embodiments. However, the purpose of the present disclosure may be achieved with a different manner from the above example embodiments including the subject matters of the present disclosure according to the nature of the art. Therefore, it should be understood that the above example embodiments are in descriptive and illustrative views, rather than restrictive views. That is, the spirit or the scope that includes the subject matters of the present disclosure and that may achieve a goal of the present disclosure should be included within the spirit or the scope of the inventive concepts of the present disclosure.

Accordingly, a modified or altered technical concept without departing from the scope or the spirit of the present disclosure is included in the scope of the claims below. The scope of the present disclosure is not limited to the above example embodiments.

What is claimed is:

1. A storage device comprising:
one or more nonvolatile memories; and
a memory controller,
wherein the memory controller is configured to cause the one or more nonvolatile memories to operate in one of a first operation mode or a second operation mode based on a data amount of at least one of (a) write data stored in the one or more nonvolatile memories or (b) read data output from the one or more nonvolatile memories, according to the operations of the one or more nonvolatile memories during each of a plurality of power supply intervals between a point in time where power is supplied and a point in time where the supplied power is interrupted.

2. The storage device of claim 1, wherein:
when the data amount is less than or equal to a reference value, the memory controller is configured to cause the one or more nonvolatile memories to operate in the first operation mode, and
when the data amount is greater than the reference value, the memory controller is configured to cause the one or more nonvolatile memories to operate in the second operation mode,
wherein the first operation mode corresponds to a journaling operation mode, and the second operation mode corresponds to a garbage collection operation mode.

3. The storage device of claim 2, wherein:
in the second operation mode, the memory controller is configured to perform a journaling operation to store full data in the one or more nonvolatile memories based on partial data in response to each of a plurality of commands provided from a host, wherein the full data includes at least one of metadata or mapping data, and the partial data includes a changed portion of the at least one of metadata or mapping data, and
in the first operation mode, the memory controller is configured to store the full data in the one or more nonvolatile memories together with a completion mark in response to one command provided from the host.

4. The storage device of claim 2, wherein the memory controller is configured to perform a garbage collection operation at a first speed in the first operation mode, and the memory controller is configured to perform a garbage collection operation at a second speed in the second operation mode, wherein the first speed is faster than the second speed.

5. The storage device of claim 2, wherein:
in the second operation mode, the memory controller is configured to store internal management data in the one or more nonvolatile memories, and
in the first operation mode, the memory controller is configured to not store the internal management data in the one or more nonvolatile memories.

6. The storage device of claim 2, wherein the reference value is dependent on a repetition of occurrences of the power being supplied followed by an interruption of the supplied power, and dependent on a life span of the storage device.

7. The storage device of claim 2, wherein when a booting operation is performed in response to the supplied power, the memory controller is configured to:
   calculate the data amount or receive the data amount from a host; and
   cause the one or more nonvolatile memories to operate in one of the first operation mode or the second operation mode, based on the calculated data amount or the received data amount,
   wherein the first operation mode corresponds to a journaling operation mode, and the second operation mode corresponds to a garbage collection operation mode.

8. The storage device of claim 2, wherein:
   in response to a change in the data amount to being greater than the reference value while in the first operation mode, the memory controller is configured to cause the one or more nonvolatile memories to operate in the second operation mode, and
   in response to a change in the data amount to being less than or equal to the reference value while in the second operation mode, the memory controller is configured to cause the one or more nonvolatile memories to operate in the first operation mode,
   wherein the first operation mode corresponds to a journaling operation mode, and the second operation mode corresponds to a garbage collection operation mode.

9. The storage device of claim 1, wherein the memory controller is further configured to provide a host with a response that indicates one of the first operation mode or the second operation mode of the memory controller, in response to a request from the host.

10. The storage device of claim 1, wherein the memory controller is configured to calculate a weighted average by (a) allocating a first weight to a first data amount corresponding to a most recent power supply interval from among the power supply intervals, (b) allocating a second weight to a second data amount corresponding to one or more power supply intervals other than the most recent power supply interval, and (c) summing the weighted first data amount and the weighted second data amount.

11. A storage device comprising:
   a memory controller;
   one or more nonvolatile memories configured to:
      store or output data under a control of the memory controller, and
      store information associated with a data amount of the data that is stored or output during each of a plurality of power supply intervals between a point in time where power is supplied to the one or more nonvolatile memories and a point in time where the supplied power is interrupted; and
   a mode register configured to store a status value that indicates one of a first operation mode or a second operation mode of the one or more nonvolatile memories, wherein the first operation mode corresponds to a journaling operation mode, and the second operation mode corresponds to a garbage collection operation mode,
   wherein the memory controller is configured to cause the one or more nonvolatile memories to operate in one of the first operation mode or the second operation mode based on the data amount.

12. The storage device of claim 11, wherein the memory controller is further configured to change the operation mode of the one or more nonvolatile memories among the first operation mode or the second operation mode in response to a command provided from a host.

13. The storage device of claim 11, wherein:
   at least one operation mode from among the first operation mode and the second operation mode is divided into a plurality of levels, and
   the memory controller is configured to perform operations on the one or more nonvolatile memories in one of the first operation mode or the second operation mode according to the plurality of levels, wherein the plurality of levels correspond to varying types of management of data stored in the one or more nonvolatile memories.

14. The storage device of claim 11, wherein the memory controller is configured to select the operation mode of the one or more nonvolatile memories further based on an amount of free blocks included in the one or more nonvolatile memories.

15. A storage device, comprising:
   one or more nonvolatile memories; and
   a memory controller,
   wherein the memory controller is configured to cause the one or more nonvolatile memories to operate in a first operation mode or a second operation mode depending on a data amount of write data stored in the one or more nonvolatile memories during each of a plurality of intervals of time.

16. The storage device of claim 15, wherein the memory controller is configured to cause the one or more nonvolatile memories to operate in the first operation mode or the second operation mode depending on a data amount of read data output from the one or more nonvolatile memories during each of the plurality of intervals of time.

17. The storage device of claim 15, wherein each of the plurality of intervals of time correspond to an interval between a point in time where power is supplied to the one or more nonvolatile memories and a point in time where the supplied power is interrupted.

18. The storage device of claim 15, wherein:
   the plurality of intervals of time include (a) a first interval of time between a first point in time where power is supplied to the one or more nonvolatile memories and a second point in time where the supplied power is interrupted, (b) a second interval of time between a third point in time where power is supplied to the one or more nonvolatile memories and a fourth point in time where the supplied power is interrupted, and (c) a third interval of time between a fifth point in time where power is supplied to the one or more nonvolatile memories and a sixth point in time where the supplied power is interrupted, and
   the memory controller is configured to cause the one or more nonvolatile memories to operate in the first operation mode or the second operation mode depending on (a) a first data amount of write data stored in the one or more nonvolatile memories during the first interval of time, (b) a second data amount of write data stored in the one or more nonvolatile memories during the second interval of time, and (c) a third data amount of write data stored in the one or more nonvolatile memories during the third interval of time.

19. The storage device of claim 18, wherein:
   the memory controller is configured to compare the first data amount to a reference value,
   in response to determining that the first data amount is less than or equal to the reference value, the memory controller is configured to cause the one or more nonvolatile memories to operate in the first operation mode, in response to determining that the first data amount is greater than the reference value, the memory controller is configured to cause the one or more nonvolatile memories to operate in the second operation mode, the memory controller is configured to compare the second data amount to the reference value, in response to determining that the second data amount is less than or equal to the reference value, the memory controller is configured to cause the one or more nonvolatile memories to operate in the first operation mode, in response to determining that the second data amount is greater than the reference value, the memory controller is configured to cause the one or more nonvolatile memories to operate in the second operation mode, the memory controller is configured to compare the third data amount to the reference value, in response to determining that the third data amount is less than or equal to the reference value, the memory controller is configured to cause the one or more nonvolatile memories to operate in the first operation mode, and in response to determining that the third data amount is greater than the reference value, the memory controller is configured to cause the one or more nonvolatile memories to operate in the second operation mode.

\* \* \* \* \*